(12) United States Patent
Cole

(10) Patent No.: US 11,625,266 B2
(45) Date of Patent: Apr. 11, 2023

(54) DATA PROCESSING DEVICE, SYSTEM AND METHOD

(71) Applicant: VOCALINK LIMITED, London (GB)

(72) Inventor: Michael Cole, Amersham (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 843 days.

(21) Appl. No.: 16/575,194

(22) Filed: Sep. 18, 2019

(65) Prior Publication Data

US 2020/0089523 A1    Mar. 19, 2020

(30) Foreign Application Priority Data

Sep. 19, 2018 (EP) ..................................... 18195336

(51) Int. Cl.
| | | |
|---|---|---|
| *G06F 15/16* | (2006.01) | |
| *G06F 9/48* | (2006.01) | |
| *H04L 9/32* | (2006.01) | |

(52) U.S. Cl.
CPC .............. *G06F 9/48* (2013.01); *H04L 9/3236* (2013.01)

(58) Field of Classification Search
CPC .................................. G06F 9/48; H04L 9/3236
USPC .......................................... 709/203; 707/703
See application file for complete search history.

(56) References Cited

U.S. PATENT DOCUMENTS

| | | | | |
|---|---|---|---|---|
| 11,005,666 | B2 * | 5/2021 | Uhr ..................... | G06Q 20/4016 |
| 11,308,448 | B1 * | 4/2022 | Knas ....................... | H04L 63/10 |
| 2015/0046466 | A1 | 2/2015 | Kaal | |
| 2017/0124556 | A1 * | 5/2017 | Seger, II .................. | H04L 69/40 |
| 2017/0134280 | A1 * | 5/2017 | Davis ................... | H04L 45/7453 |
| 2017/0235970 | A1 | 8/2017 | Conner | |
| 2019/0052467 | A1 * | 2/2019 | Bettger .................... | H04L 9/088 |
| 2019/0057379 | A1 * | 2/2019 | Chalakudi ............... | H04L 67/06 |
| 2019/0080392 | A1 * | 3/2019 | Youb ..................... | G06Q 20/401 |

OTHER PUBLICATIONS

Extended European Search Report issued in European Application No. 18195336.5 dated Mar. 20, 2019,11 pages.

* cited by examiner

*Primary Examiner* — Duyen M Doan

(74) *Attorney, Agent, or Firm* — Talem IP Law, LLP

(57) ABSTRACT

A first data processing device can include circuitry configured to receive an electronic request message; generate first electronic information using the electronic request message; receive, from each of one or more second data processing devices, respective first characteristic data of respective second electronic information generated by that second data processing device; generate, for each of the one or more second data processing devices, respective second characteristic data of the first electronic information; compare, for each of the one or more second data processing devices, the first characteristic data with the second characteristic data; and when one or more matches between the first characteristic data and second characteristic data for the one or more second data processing devices meet a predetermined condition, perform a predetermined process using the first electronic information in response to the electronic request message.

12 Claims, 11 Drawing Sheets

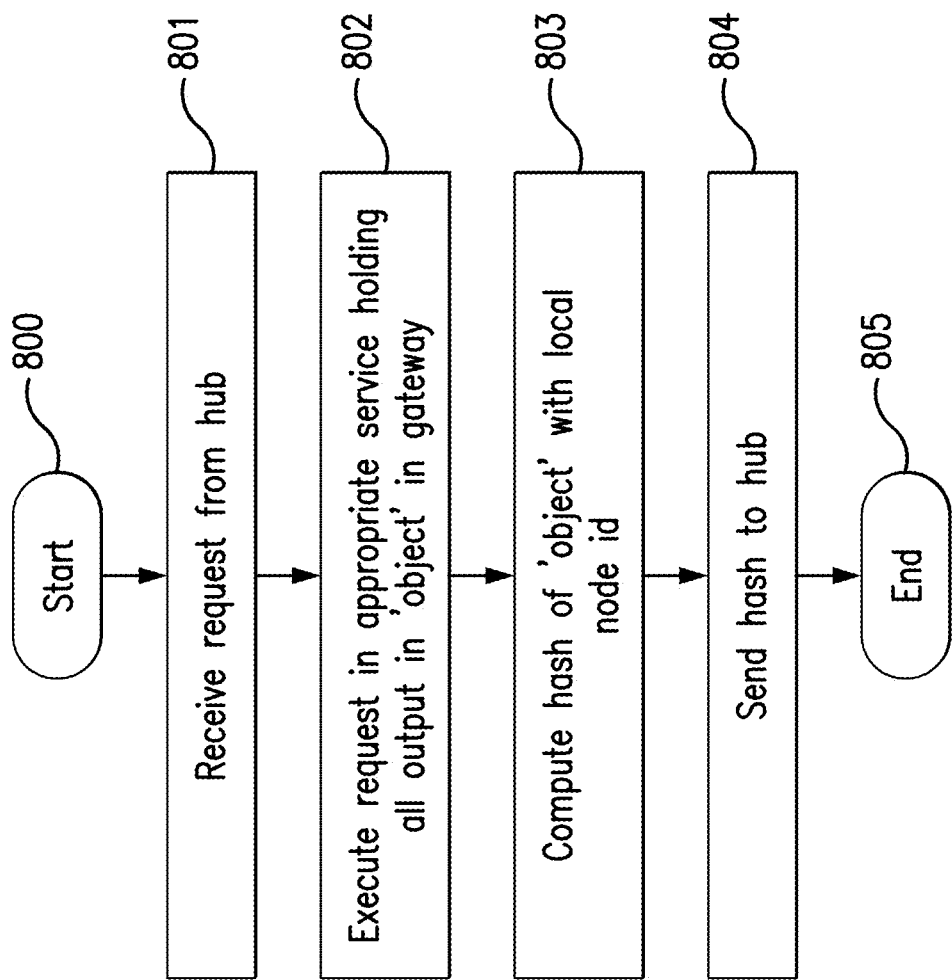

DATA PROCESSING DEVICE, SYSTEM AND METHOD

TECHNICAL FIELD

The present disclosure relates to a data processing device, system and method.

BACKGROUND

The "background" description provided herein is for the purpose of generally presenting the context of the disclosure. Work of the presently named inventor, to the extent it is described in the background section, as well as aspects of the description which may not otherwise qualify as prior art at the time of filing, are neither expressly nor impliedly admitted as prior art against the present disclosure.

Electronic services are often provided by a data processing apparatus managed by a central entity such as a firm or government. Users of such a service must therefore trust the central entity to correctly process requests to the service.

It has been suggested that, instead of using a central entity, multiple copies of a service may be provided by data processing apparatuses managed by multiple respective entities. This alleviates the need for trust of a single, central entity because, for a request to be processed, the processing needs to be agreed upon by the multiple entities. If a request is processed incorrectly at one entity, then this will create a discrepancy between that entity and one or more of the other entities. The incorrect processing is therefore detectable in such a system and can be suitably addressed. Services provided by multiple entities in this way may be referred to as shared services. The agreement between multiple entities regarding the processing of a request may be referred to as consensus.

A problem is how to implement such shared services efficiently and reliably.

BRIEF SUMMARY

The present disclosure is defined by the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 shows a flow chart illustrating a method in which a node generates and transmits a cryptographic hash;

DETAILED DESCRIPTION

Figure 1B:
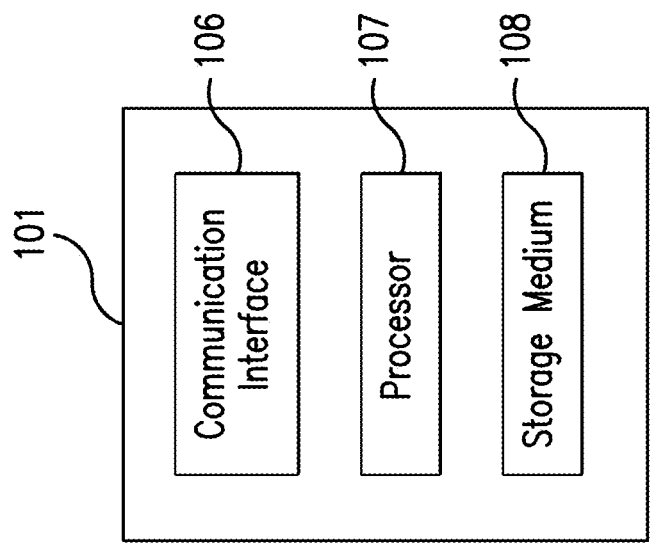
FIGS. 1A and 1B schematically show data processing devices.

Referring now to the drawings, wherein like reference numerals designate identical or corresponding parts throughout the several views.

Figure 1A:
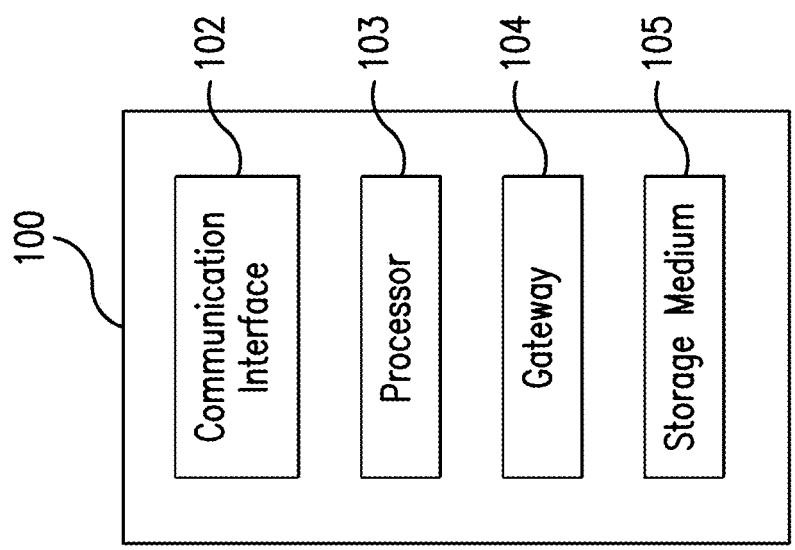

FIGS. 1A and 1B show, respectively, a first data processing device 100 and a second data process device 101, according to embodiments. Multiple instances of the first data processing device 100 (which may be referred to as a node) may be connected to each other via the second data processing device 101 (which may be referred to as a hub). Thus, data transmitted from one node to another node is transmitted via the hub.

Each first data processing device 100 (node) comprises a communication interface 102 for transmitting and/or receiving data, a processor 103, a gateway 104 and a storage medium 105. The storage medium 105 of each node stores electronic data (e.g. computer code) for providing the same electronic service. This electronic service is therefore a shared service. The storage medium 105 may be, for example, a solid state drive, hard disk drive, tape drive or the like. Each of the communication interface 102, processor 103 and gateway 104 are implemented using appropriate circuitry, for example. The processor 103 controls the operation of each of the communication interface 102, gateway 104 and storage medium 105.

The second data processing device 101 (hub) comprises a communication interface 106 for transmitting and/or receiving data, a processor 107 and a storage medium 108. The storage medium 108 may be, for example, a solid state drive, hard disk drive, tape drive or the like. Each of the communication interface 106 and processor 107 are implemented using appropriate circuitry, for example. The processor 107 controls the operation of the communication interface 106 and storage medium 108.

Figure 2:
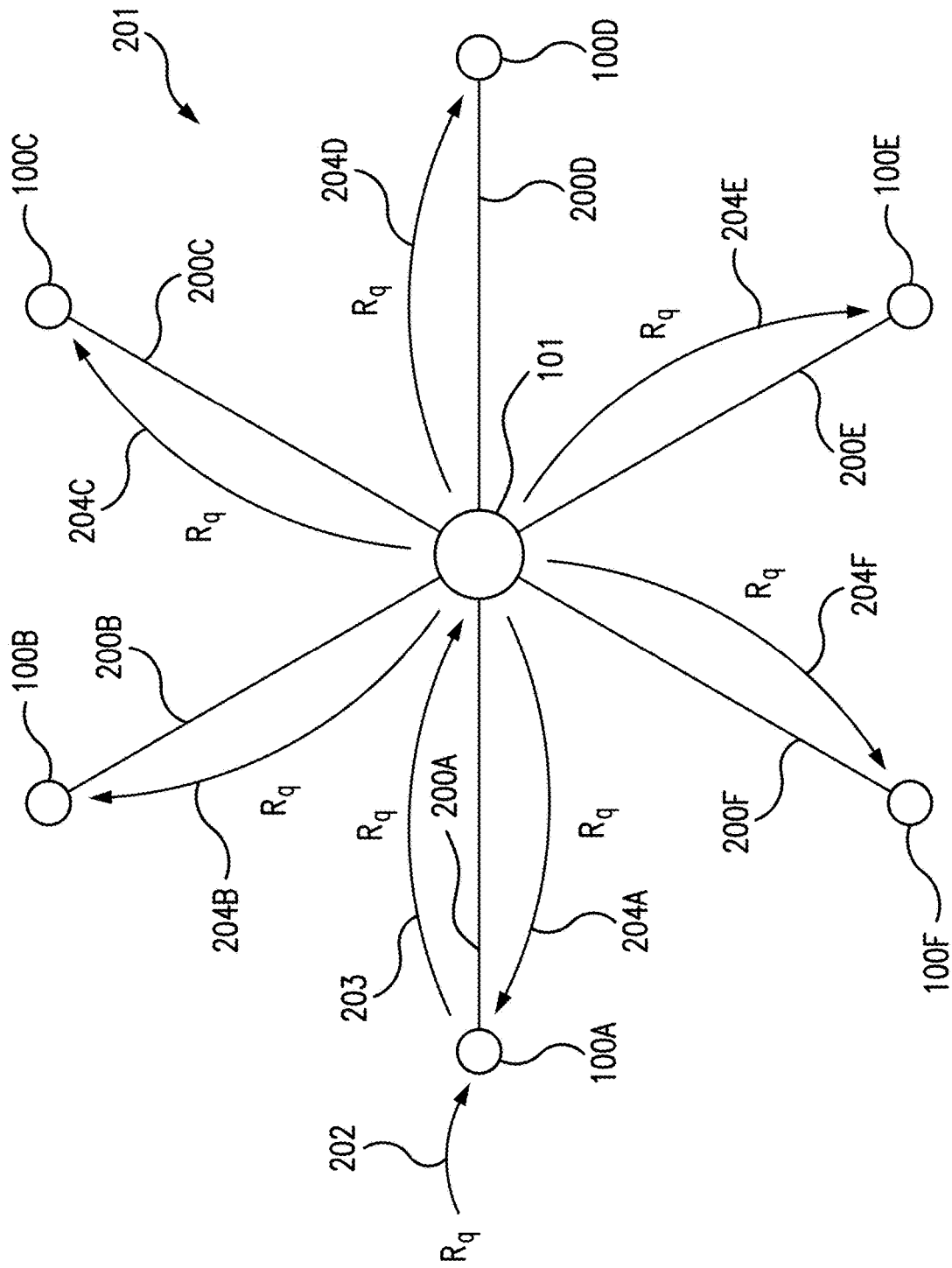
FIG. 2 schematically shows a receipt of an external request and then its distribution to all nodes of the data processing system.

FIG. 2 shows an example network (system) 201 according to an embodiment. In this case, there are six nodes 100A to 100F (each having the form of the node 100 described with reference to FIG. 1A) each connected to a hub 101 via a respective data communication channel 200A to 200F. Each data communication channel allows data to be transmitted from the communication interface 102 of its respective node to the communication interface 106 of the hub 101 and data to be transmitted from the communication interface 106 of the hub 101 to the communication interface 102 of its respective node. The communication interface 102 of each node is also able to transmit data to and receive data from one or more devices (not shown) outside the network 201.

The communications channels are all sequential, that is messages sent along them are positioned into an order within that channel. The operation of the hub is such that as messages from the nodes arrive at the hub they are placed into an order within the hub and sent in that same order back to all of the nodes. Thus, all nodes see the messages from the hub in the same order. The sole condition on the order determined by the hub is that it contains all messages that arrive at the hub (i.e. no messages are discarded by the hub) and that for each pair of messages A, B that arrive at the hub from the same node, if A arrived before B at the hub, then A will be ahead of B in the order determined by the hub. The hub may place other messages (from other nodes) between A and B. but A and B's relative position (insofar as one is ahead of the other) is preserved.

In this way the network acts as to simultaneously permit peer-to-peer communication between the n nodes, but with only 2n communications channels to maintain (instead of a more traditional $n^2$ channels). Further, this scheme imposes an order common to all nodes (that determined by the hub) on all communications from the nodes collectively. This eliminates from this scheme much of the complexity of peer-to-peer networking protocols, which traditionally would need to consider cases where pairs of nodes might detect the same pair of message from nodes, but not receive them in the same order and so be unable to agree on their precedence in general (such as when the messages describe payments contending for the same funds). It also aids consensus processing (explained below) where the nodes are intended to operate by consensus and the formation of this consensus first requires an order for message processing to be established.

In the example of FIG. 2, each of the nodes 100A to 100F provides, as the shared service, an electronic ledger. The electronic ledger (which may be referred to as a shared or distributed ledger) records transactions which have occurred and completed successfully. For example, the ledger may record, in chronological order, a list of financial transactions, wherein each financial transaction in the list comprises data indicating a sender of money, a receiver of money and how much money (in a given currency) is sent. The concept of a shared ledger usefully demonstrates the benefits of a shared service for which requests (e.g. requests to add a new transaction to the shared ledger) are processed by consensus. The lack of a central data management entity removes the need for trust in such a central management entity to keep accurate records of transactions. Furthermore, the fact that new transactions can only be added by consensus by each holder of the shared ledger data helps to prevent incorrect or fraudulent transactions from being added to the shared ledger. However, it will be appreciated that the described technique is applicable to types of shared services other than a shared ledger.

In the example of FIG. 2, the node 100A receives a request Rq from a device (not shown) external to the network 201. This is indicated by arrow 202. Rq is in the form of an electronic message and is a request for a transaction to be added to the shared ledger. Rq identifies, for example, the sender of money, receiver of money and how much money (in a given currency) is to be sent. In response to receiving Rq, the node 100A forwards Rq to the hub 101, as indicated by arrow 203. The hub 101 then forwards a copy of Rq to each of the nodes 100A to 100F, as indicated by the respective arrows 204A to 204F.

It is noted that the node 100A receives a copy of Rq from the hub 101 (as indicated by arrow 204A) even though it previously received the original copy of Rq from the external device (as indicated by arrow 202). The node 100A is configured to perform subsequent processing on the basis of the copy of Rq received from the external device or from the hub 101. Processing the copy of Rq received from the hub 101 (rather than the copy of Rq as originally received from outside the network), however, helps ensure that the order in which requests are processed is the same for each node. It is desirable for the order in which requests Rq received by the network are processed to be the same for each node because the outcome of one request may affect the outcome of a subsequent request, and therefore, in order to achieve consensus amongst the nodes, it is necessary for each node to process the requests in the same order so as to ensure the same outcome of those requests. By each node processing the copy of each request Rq as received from the hub 101 (even if that node received the original request Rq from outside the network 201), it is ensured that the order in which such requests are processed is the same for all nodes.

As a further point, by the hub 101 forwarding Rq to each of the nodes 100A to 100F (including the node 100A that transmitted Rq to the hub 101 in the first place), the hub 101 is not required to perform processing to determine from which of the nodes 100A to 100F it received Rq (in this case, 100A) and to forward Rq only to the other nodes (in this case, 100B to 100F). Rather, the hub 101 is only required to perform processing to forward a copy of Rq to each of the nodes 100A to 100F to which it is connected. Processing at the hub 101 is therefore reduced.

The processor 103 of each node 100A to 100F executes a predetermined process using the data contained in Rq. The predetermined process executed at each node is the same and may be implemented as computer code stored in the storage medium 105 defining a set of instructions to be executed using the data contained in Rq. The output of the process at each node is a set of information. For example, when Rq is a request for a transaction (identified in the request) to be added to the shared ledger stored in the storage medium 105, the output set of information comprises the information necessary for adding the transaction to the shared ledger (for example, the data identifying the attributes of the transaction itself and the computer code to be executed to add the transaction to the shared ledger). The output set of information may be referred to, more generally, as an object.

Once each node has generated a respective object using Rq, the object is temporarily stored in the gateway 104 of each node. The gateway 104 provides an interface between the requests such as Rq received by the communication interface 102 and the shared ledger stored in the storage medium 105. The gateway 104 does not allow an object stored in the gateway to be used to add a transaction to the shared ledger until a consensus process (described below) has been successfully carried out. Although the gateway 104 is shown in FIG. 1A as being a separate entity to the processor 103 and storage medium 105, the gateway 104 may be implemented using the processor 103 and storage medium 105. For example, the processing carried out by the gateway 104 may be carried out by the processor 103 and objects temporarily stored in the gateway 104 may be stored in the storage medium 105 within a separate logical partition to a logical partition in which the shared ledger data is stored.

After the object is stored in the gateway 104, a string of data is generated by the processor 103 based on the object. The string of data is generated such that two objects comprising the same data (that is, the data necessary for adding the transaction to the ledger) generate the same string. In order to achieve consensus, more than a predetermined number of the nodes 100A to 100F must generate objects comprising the same data, thereby generating the same string. The predetermined number of nodes may be determined in advance, either as an explicit number (e.g. 3 nodes) or based on a predetermined portion of the nodes and the total number of nodes (e.g. 50% of nodes when there are 6 nodes, leading to a predetermined number of 3 nodes).

The processor 103 of each node then generates a cryptographic hash based on a new string comprising a combination of the string generated based on the object (this may be referred to as the object string) and an identifier of the node. This new string may be referred to as a hashing string, and is generated using the object string and node identifier in the same way for each node (the same rules for generating the hashing string may be configured at each node in advance). For all nodes which generate the same data in their respective object (this may be referred to as having the same object data), the same object string will have been generated. However, each node is uniquely identified by its identifier (that is, there is a one-to-one relationship between the identifiers and the nodes). Each identifier is another string of data which is combined with (e.g. appended to) the object string generated from the object data to generate a hashing string. The hashing string is then cryptographically hashed (using a suitable Secure Hash Algorithm (SHA), for example). Thus, although the object strings generated by all nodes having the same object data are the same, the corresponding hashing strings of the nodes are all different from each other. The hashes of the hashing strings generated by the nodes are therefore also all different from each other. Once the hash is generated by a node, it is transmitted to all other nodes via the hub 101.

Figure 3:
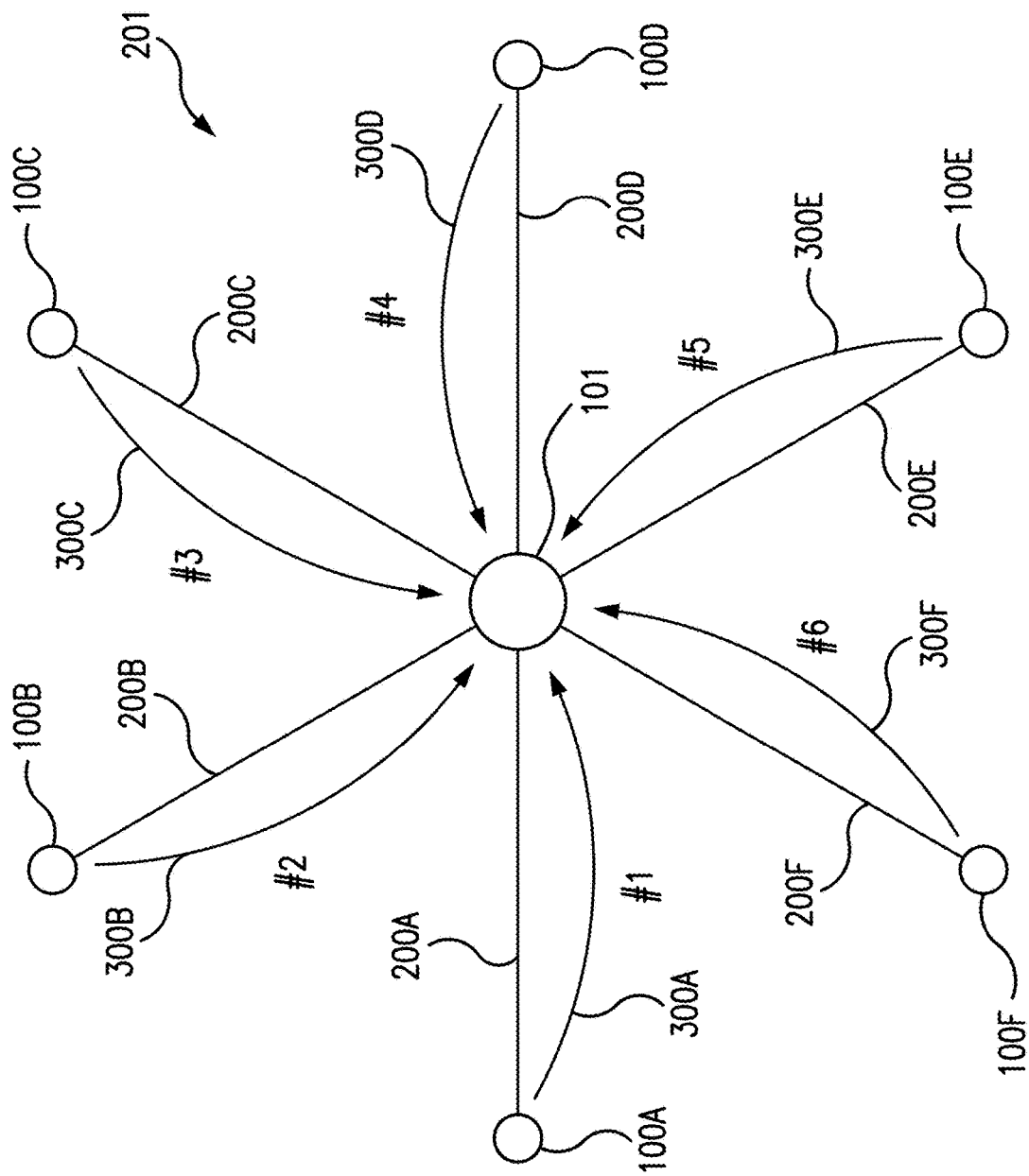
FIGS. 3 and 4 schematically show a distribution of cryptographic hashes between nodes of the data processing system.
Figure 4:
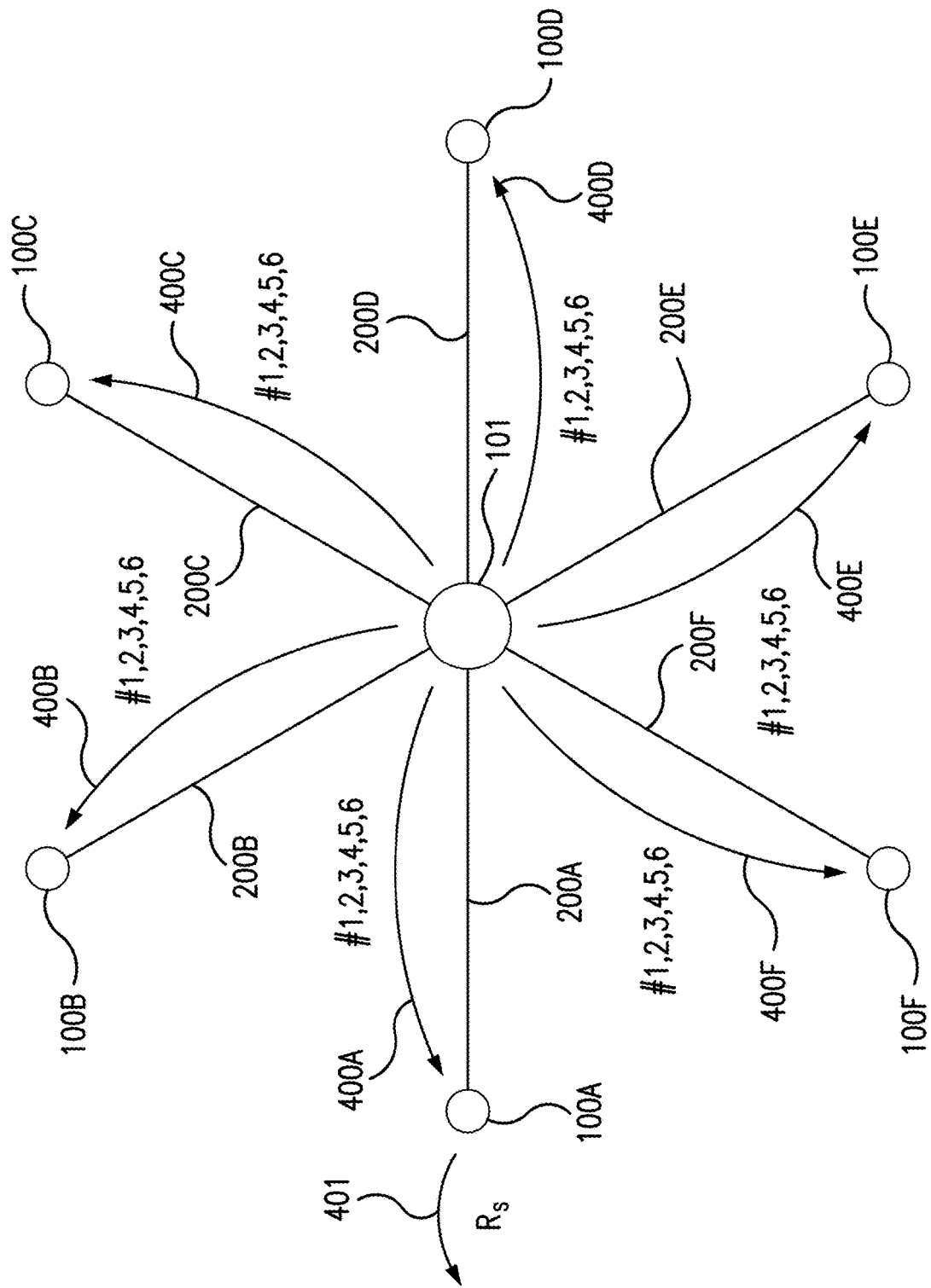

This is illustrated in FIGS. 3 and 4. As shown in FIG. 3, each of the nodes 100A to 100F transmits its respective hash #1 to #6 the hub 101 (as indicated by the respective arrows 300A to 300F). As shown in FIG. 4, the hashes #1 to #6 of all nodes are then transmitted by the hub 101 to all nodes (as shown by the respective arrows 400A to 400F). By the hub 101 forwarding all hashes to all nodes (so that each node receives the hash that it itself created in addition to the hashes created by all of the other nodes), the hub 101 is not required to perform processing to determine from which of the nodes 100A to 100F each hash is received and to forward only the hashes to each node which were not created by that node. Rather, the hub 101 is only required to perform processing to forward a copy of each of the received hashes #1 to #6 to each of the nodes 100A to 100F to which it is connected. Thus, for example, although node 100A generated hash #1 and node 100B generated hash #2, each of nodes 100A and 100B receives the entire set of hashes #1 to #6. The hub 101 therefore does not need to perform any processing to determine and transmit a reduced set of hashes #2, #3, #4, #5, #6 to node 100A, a reduced set of hashes #1, #3, #4, #5, #6 to node 100B, etc. Processing at the hub 101 is therefore reduced.

Transmitting all hashes to all nodes also ensures that the order in which each hash is received and processed by each node is the same for all nodes. This makes checking that consensus occurred (consensus auditing, as explained below) easier at a later time, because all nodes will record information confirming that consensus occurred (including the hashes received from all nodes via the hub 101) in the same way (including recording all received hashes in the same order). This information itself may then be confirmed by consensus amongst the nodes, for example.

Each node then performs the subsequent comparison process on all received hashes and all node identifiers (including its own identifier).

Upon completion of the data transmission shown in FIGS. 3 and 4, each node 100A to 100F has (for each request Rq) stored in the storage medium 105 the object string of that node (that it created itself) and a set of hashes (received from each of the other nodes). Each node also has stored in the storage medium 105 the node identifier of all other nodes. All hashes generated by the nodes are generated using the same cryptographic hash function (configured at all nodes in advance), which is applied to the hashing strings generated by the nodes.

In order for the node 100A to determine whether the object data generated by that node is the same as the object data generated by one of the other nodes 100B to 100F (which should be the case if both nodes have correctly generated an object based on the received request Rq), the node 100A creates a new hashing string comprising a combination of the object data string of the node 100A and the identifier of the other node. The node 100A then hashes this newly created hashing string and compares the resulting hash with the hash received from the other node. If the hash is the same, then the node 100A determines that the object string (and therefore the object data) generated by the node 100A and the other node was the same and that there is a consensus between the node 100A and the other node regarding the object data generated by these respective nodes.

If that object data were to be processed to add a transaction to the shared ledger stored at each of the nodes, it can therefore be determined that the same transaction would be added to the shared ledger at each of the nodes.

It is noted that this consensus is possible (without allowing nodes to simply copy each other's responses) because, in the field of cryptographic hash functions, applying a cryptographic hash function to a string of data in order to generate a hash is computationally simple. However, a cryptographic hashing algorithm (CHF) can be selected and used in this design to ensure that it is computationally unfeasible to determine the string of data required to generate a particular hash. The node 100A can therefore be assured that, for example, if a cryptographic hash received from node 100B of a hashing string comprising a combination of an object string generated at node 100B and a node identifier of node 100B is the same a cryptographic hash generated at node 100A of a hashing string comprising a combination of an object string generated at node 100A and the node identifier of node 100B (stored in the storage medium 105 of node 100A in advance), then the object string of the nodes 100A and 100B is the same. Node 100B performs a corresponding process, and is thus able to determine that the object string of the nodes 100A and 100B is the same. Each of the nodes 100A and 100B is therefore able to establish consensus regarding the object string generated by each node and therefore regarding the object data stored in its respective gateway 104 without the need for the object data itself to be shared.

It is noted that, in embodiments, a generated object string indicates any requests, responses and updates associated with a received request Rq and is structured in a deterministic way (e.g. its component parts are ordered in the same way for all of the nodes) so that, when the object string is created, it is always the same for the same given object. Thus, for the same object, the same object string and therefore the same hash (or other characteristic data) will be generated. This helps ensure that nodes will detect a match during the consensus procedure if those nodes have generated the same object.

Figure 5:
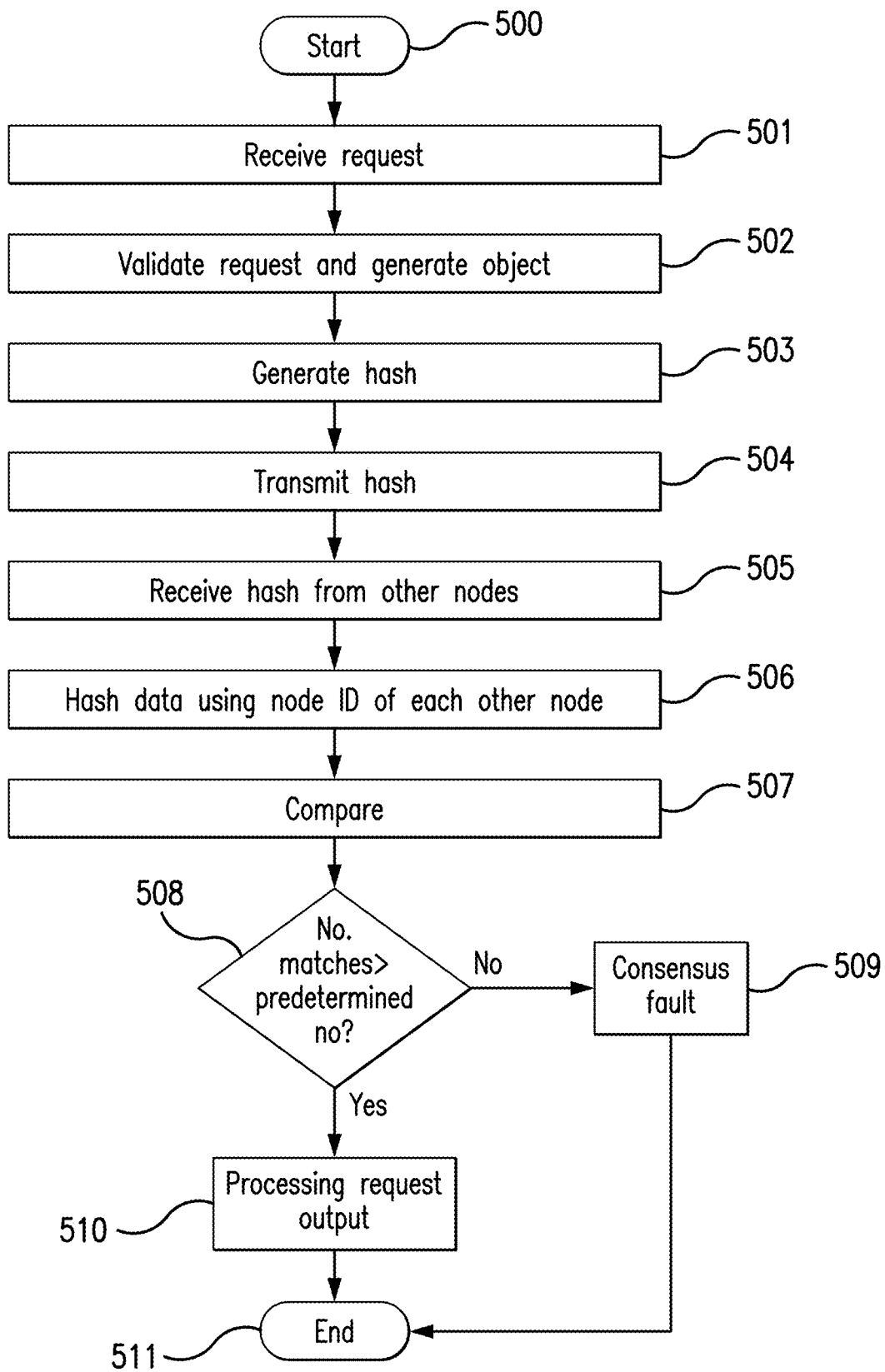
FIG. 5 shows a flow chart illustrating a data processing method.

FIG. 5 shows a flow chart illustrating an example process of the present technique. For the sake of clarity of explanation, the process is explained as being carried out by node 100A. However, it will be appreciated that this process is concurrently carried out by all of the nodes 100A to 100F.

The process starts at step 500. At step 501, the node 100A receives the request Rq from the hub 101 (Rq having been previously received by the node 100A from an external device (not shown)). At step 502, the request is validated and executed and a response is created indicating whether it was successful (and therefore whether the transaction associated with the request should be added to the shared ledger). Further, an object is generated using the data comprised within Rq and the response. The object is stored in the gateway 104. As previously mentioned, by all nodes (including node 100A) processing Rq in the order (relative to other requests) at which it is received from the hub 101, consensus is ensured even when the outcome of processing Rq depends on or is depended on by the outcome of processing of other requests.

At step 503, an object string is generated based on the object. A hashing string is generated by combining the object string with a string comprising the identifier of the node 100A. For example, the hashing string may take the form [object string of node 100A+identifier of node 100A]. The hashing string is then cryptographically hashed to generate hash #1.

At step 504, hash #1 is transmitted to the hub 101 which then forwards the hash #1 to all of the nodes 100A to 100F. At step 505, hashes #1, #2, #3, #4, #5 and #6 are received from the hub 101. At step 506, the node 100A creates corresponding hashes to compare with each of the respective received hashes. Thus, for example, node 100A creates a hash #2', which takes the form of CHF [object string of node 100A+identifier of node 100B] for comparing with hash #2 (generated by node 100B), the node 100A creates a hash #3', which takes the form CHF [object string of node 100A+identifier of node 100C] for comparing with hash #3 (generated by node 100C), and so on. In this case, CHF is the cryptographic hash function used, wherein CHF [x] creates a cryptographic hash of the string 'x'. The node therefore creates hashes #1', #2', #3', #4', #5' and #6' to be compared with hashes #1, #2, #3, #4, #5 and #6, respectively (the latter hashes being created by each node 100A to 100F). The node 100A may disregard the received hash #1 (which it created itself) and not generate a new #1', since it ought to be the case that #1=#1'. Alternatively, the node 100A may nonetheless generate a new #1' and undertake the comparison, since this will not affect the overall result. Regardless of whether the node 100A recomputes its object hashing string, or simply stores that hashing string #1 to compare with what was received from itself via the hub, in all other respects node 100A treats its own response identically to that of responses from other nodes on the node network. This ensures that the consensus process proceeds identically (in the absence of a network or node fault) for each node, allowing nodes to be certain of the consensus reached, and makes it easier for consensus audit information stored at each of the nodes to be stored in the same way, thereby ensuring that consensus audit information can itself be confirmed by consensus.

At step 507, each newly created hash #1', #2', #3', #4', #5' and #6' is compared with its corresponding respective received hash #1, #2, #3, #4, #5 and #6. In the case that the object string of node 100A matches the object string of node 100B, hash #2'=hash #2 (this may be referred to as a hash match). Otherwise, hash #2' hash #2. Similarly, in the case that the object string of node 100A matches the object string of node 100C, hash #3'=hash #3 (otherwise, hash #3'≠hash #3), in the case that the object string of node 100A matches the object string of node 100D, hash #4'=hash #4 (otherwise, hash #4'≠hash #4), and so on.

At step 508, it is determined whether the number of matches is greater than a predetermined number. When there are more matches than the predetermined number, the process proceeds to step 510, in which the result of processing the request Rq (stored in the gateway) is output. In this case, the object stored in the gateway 104 is retrieved and processed so as to add the transaction identified in Rq to the shared ledger (assuming that the processing outcome of the request was to allow the request). The process then ends at step 511. On the other hand, when there are not more matches than the predetermined number (as can be determined based on the total number of nodes and the number of non-agreeing responses so far received), the process proceeds to step 509, which flags a consensus failure error condition detected at that node. The transaction identified in Rq is therefore not added to the shared ledger. Such an error may be limited to the node concerned or, if signaled by many nodes for the same transaction, indicate a fault within the wider network of nodes. The process then ends at step 511.

In the case that the node 100A is the node which initially received the request Rq from an external device (as shown by arrow 202 in FIG. 2), upon completion of step 509 or 510, a response Rs 401 is transmitted back to the external device (as shown by arrow 401 in FIG. 4). In the case that step 509 is completed, the response Rs indicates that processing of the request Rq was not completed due to a failure of consensus. On the other hand, in the case that step 510 is completed, the response indicates that processing of the request Rq was completed due to successful consensus, and contains a status to indicate whether or not the transaction was successful and added to the shared ledger.

It is noted that, due to the use of cryptographic hashes in the way described, it is not possible for the node to determine the object string (and therefore the object data) of another node. All that each node may determine, based on the hash received from each of the other nodes, is whether or not the object string as generated by that node was also generated by the other nodes and hence by a sufficient number of the network nodes (including itself) overall. The risk of a node processing object data from another node which has been incorrectly or fraudulently generated by that other node is thus alleviated, since the other node is not able to produce and send a matching hash without having itself correctly created the object string (and therefore the object data) for the original request (which it can only practically do by genuinely and correctly executing the original request).

Although it has been described that there is successful consensus for a request Rq if more than a predetermined number of hash matches occur, it will be appreciated that, more generally, there may be successful consensus if the hash matches meet one or more predetermined conditions. For example, the condition may be that a hash match must occur for all nodes, that a hash match must occur for all but a predetermined number of nodes, that a hash match must occur for the majority of nodes or that a hash match must occur for a single node. In the latter example (single node match), the result is that the node undertaking the comparison must agree on the object string with only one other node. The other node may be a validator node which has a special status such that, if there is consensus with this one validator node and another node, the other node determines that consensus has occurred. The validator node may be managed by an entity for which there is a high level of trust, for example (thereby making consensus with this single validator node sufficient). It will be appreciated that other predetermined conditions may be imposed on the hash matches in order to determine whether or not there is consensus for a particular request Rq.

Once the consensus for a request Rq has been checked, processing of the request Rq is completed (in the case of successful consensus) or aborted (in the case of a lack of consensus) and the object deleted from the gateway 104. Multiple objects relating to multiple respective requests may be queued in the gateway 104 (in an order determined in accordance with the order in which the requests are received from the hub 101) and sequentially processed according to the present technique. Alternatively, or in addition, the objects held in the gateway 104 may be held indexed by an identifier relating them to their respective request Rq, such that they can be fetched to participate in the consensus processing above based on that same identifier being included alongside the corresponding cryptographic hash sent by each node for the same request Rq.

It will thus be appreciated that, with the present technique, successful consensus occurs only when one or more predetermined consensus conditions are met based on hash matching between nodes. Each node performs a set of complementary hash matches with each other node, and therefore a failure of a hash match at one node will be associated with a failure of the corresponding hash match at one or more of the other nodes.

The determination of a successful consensus is separate to the allowance or rejection of a request.

A request requires a response and that response may indicate that the request has been allowed or that the request has been refused. The allowance or refusal of a request is carried out by the processor 103 of each node processing the request, determining a response to the request based on whether or not one or more predetermined conditions (e.g. business logic) associated with the request are met and incorporating this response in the object generated based on the request. This object (containing either a positive response allowing the request or a negative response refusing the request) then forms the basis for consensus. Thus, a request may be allowed or refused, but this will always be by consensus. If there is no consensus, then this implies a fault with one or more of the nodes, or with another element of the network 201.

For example, if the request is to add a certain transaction to a shared ledger, then the processing of the request at each node (in order to produce the object which is then held in the gateway) will result in the request being allowed if the payer has sufficient funds for the transaction or refused if the payer does not have sufficient funds for the transaction. This allowance or refusal is recorded in the object produced by each node. Consensus is then carried out on the basis of this object.

Thus, if the object indicates that the request has been allowed (i.e. because there are sufficient funds) and this object is approved by consensus, then the new transaction will be added to the shared ledger. The response Rs will be a positive response.

If the object indicates that the request has been allowed (i.e. because there are sufficient funds) but this is not approved by consensus, then the new transaction will not be added to the shared ledger. The response Rs will be a negative response and will indicate that this was because of a consensus failure.

If the object indicates that the request has not been allowed (i.e. because there are not sufficient funds) and this object is approved by consensus, then the new transaction will not be added to the shared ledger. The response Rs will be a negative response and will indicate that this is because of there being insufficient funds available to the payer.

If the object indicates that the request has not been allowed (i.e. because there are not sufficient funds) and, furthermore, this object is not approved by consensus, then the new transaction will not be added to the shared ledger. The response Rs will be a negative response and will indicate that this is because of a failure of consensus.

A negative response Rs to a request Rq occurs either due to the request itself being refused as part of the normal processing of that request by a node (e.g. not allowing a transaction to occur when the payer has insufficient funds for the transaction) or to a lack of consensus regarding the processing of each request (as indicated by a lack of consensus of objects generated using the request at different nodes). A lack of consensus is caused by a fault at one or more of the nodes, or a fault elsewhere in the network 201. When there is a failure of consensus, each node thus records (e.g. in its respective storage medium 105) the other nodes with which there was a lack of consensus. This allows consensus failures to be investigated by an administrator of the node and possibly also by an (other) administrator(s) of the network 201.

It is useful for messages transmitted over the network 201 to be timestamped. Requests (e.g. Rq) and responses (e.g. Rs) may all be timestamped. Furthermore, when a request is processed in order to generate an object, that object may comprise a timestamp. For example, if the request is to add a new transaction to a shared ledger and this request is processed at each node in order to generate an object, the object may comprise a response with a timestamp indicative of the date and/or time at which the transaction was processed. In order to ensure consensus, it is necessary for the same timestamp to be applied by each node. This is true for any service whose output is determined at least in part with reference to the current time as input to its business logic or for producing results and responses that incorporate a timestamp or other value based at least partly upon the time of request processing. Each node therefore needs to have a clock which is synchronized with the clock of all other nodes.

In order to achieve this, the clock time for request processing at a node is computed from the previous messages received by that node from the hub (these messages being a request Rq and the hashes received from each of the other nodes, for example). All Rq messages and hashes from the hub are timestamped (by the original node which sent that message to the hub) and carry the identifier of the node that sent them (each message also carries a digital signature of the node which originally sent it so that the identity of the node which sent it can be verified). A table is kept in each node (e.g. stored in the storage medium 105) of the last timestamp seen from each node. For example, this table is updated on receipt of every Rq or hash from the hub. The processor 103 at each node then computes a timestamp from this table. The timestamp is calculated deterministically from the values in the table. For example, the timestamp may be the median value of the values in the table. This timestamp is then used in all subsequent processing of that message. For example, an Rq will be processed as if it had been received at the time indicated by the newly calculated timestamp. Thus, when a response is generated based on Rq, the response will be timestamped with the newly calculated timestamp. This response will then be held in the created object.

Because each message received by a particular node arrives in the same order from the hub and further is timestamped by the node which sent it and this timestamp is not altered by the hub, the timestamp table stored at each node is the same for all nodes. The deterministically calculated timestamp is therefore also the same for all nodes (as long as each node determines the timestamp using the same algorithm, which may be ensured by so pre-configuring the nodes). Objects determined at least in part by the time their requests were executed therefore have the same deterministically calculated timestamp for all nodes, thereby making their objects identical and allowing consensus to take place. Recording the consensus also uses the calculated timestamp, thereby ensuring that a record that consensus occurred for a particular request stored at each node (e.g. in the storage medium 105) has a consistent timestamp across all nodes (allowing the consensus record itself to be checked by consensus, if necessary).

The regularly updated timestamp generated using the table of timestamps of received messages is the equivalent of each node having a synchronized clock, without the need for dedicated links between the nodes to ensure the clock synchronization (thereby reducing network overhead). This may be referred to as a shared clock. When there is little network traffic, the nodes send empty 'clock messages' (to the hub for relay to all nodes) at a predetermined rate (e.g. once a second) in order for the table at each node to be updated and for the shared clock to be advanced ready for the next request Rq message to arrive. In order to ensure that the shared clock advances in only a forward direction (e.g. to stop the shared clock reversing in time due to a delay and/or discrepancy in the message timestamps received from the different nodes on the basis of which the shared clock time is determined), a rule may be implemented as part of the shared clock algorithm to prevent the shared clock from going backwards. For example, if the latest determined shared clock time is earlier than the previously determined shared clock time, the shared clock time can simply be advanced by a predetermined amount (e.g. one second, or alternately simply not advanced at all) instead of using the newly determined earlier clock time. This helps avoid confusion due to a shared clock which might go backwards as well as forwards.

With the present technique, the external device (not shown) which sends the original request Rq to the system 201 and which eventually receives the response Rs does not need to have any special features to enable it to work with the system 201. The external device may be a conventional computer which is able to transmit and receive electronic messages from nodes of the system 201. Users of conventional computers may therefore benefit from the consensus-based updates to shared data provided by the present technique.

In order for each node to be able to determine from which other node a particular hash was received, the electronic message containing the hash received from each node may comprise the identifier of that node. Thus, for example, hash #1 transmitted by node 100A may be comprised within a message comprising, in addition to hash #1, data indicative of an identifier of node 100A. Such a message may be referred to as a hash message. Similarly, node 100B may transmit hash #2 within a hash message comprising, in addition to hash #2, data indicative of an identifier of node 100B, node 100C may transmit hash #3 within a hash message comprising, in addition to hash #3, data indicative of an identifier of node 100C, and so on.

Alternatively, or in addition, each hash message may comprise a digital signature of the node which sent it, thereby allowing each node to verify that each hash message it receives has been genuinely transmitted from one of the other nodes of the network and to verify which of the other nodes transmitted the hash message.

The use of such digital signatures in transmitting the hash messages also allows a consensus record for each request which is processed to be stored as part of a consensus audit log in the storage medium 105 of each node. Each consensus record in the consensus audit log is associated with a particular request and may comprise, for example, the object string of the object associated with the request together with the digitally signed hash messages from each of the nodes used for determining consensus (for example, the nodes 100A to 100F). For each node used for determined consensus, a string comprising the object string stored in the consensus record and the identifier of the node may be independently determined, hashed and compared with the hash in the digitally signed hash message received from that node. That a hash match occurred can therefore be independently verified using only a single node based on the consensus record stored in the storage medium 105 of that node.

An alternative to (or supplement to) each hash message comprising a digital signature of the node which sent it is for the hub 101 (or some other element on the node network) to securely store (e.g. in the storage medium 108) a log of all traffic travelling through the hub (including the hash message transmitted by each node in response to a particular request). An individual node's record of the hashes received from each other node at a given time (each hash being time stamped by the node which sent it) can then be compared with the traffic log stored at the hub 101 at that time in order to confirm that such hashes were indeed sent from those other nodes.

Although the above-mentioned embodiments discuss processing requests by consensus in the context of shared ledgers, the present technique is not limited to this. On the contrary, the present technique may be applied to the processing of any type of request associated with any type of service for which consensus between several independent nodes is desirable. In this case, in response to a node receiving a request from the hub 101, a predetermined process associated with the service with which the request is associated is executed using the data contained in the request. The predetermined process generates an object which is stored in the gateway 104 and used to generate an object string for consensus processing based on hash matching. If and only if the one or more consensus conditions associated with the hash matching are met is the consensus successful.

The gateway 104 acts as a buffer between the outcome of a service processing a request Rq (data generated by the processing of the request by the service being stored in the object) and the outcome of that request actually updating data associated with the service (e.g. a shared ledger) which is stored in the storage medium 105 being permanently changed. Thus, when a request is received by a node, the request is processed by an appropriate service hosted at that node (each service hosted at a node being implemented as computer code stored in the storage medium 105 which is executed by the processor 103, for example). As a result of processing the request, the service produces one or more responses and/or requests it wishes to send resulting from the processing of the request (the processing of one request may lead to the generation of another request in order for processing of the first request to be completed) and any updates to data associated with the service that is stored in the storage medium 105 (the storage medium 105 may comprise one or more data repositories associated with the service within which the data is stored). Any generated response(s), request(s) and data updates are then held in the 'object' inside the gateway until consensus occurs. Once consensus has occurred, the processor 103 executes all the elements of the object. For example, any response(s) and request(s) are sent to their appropriate destinations and any data repository updates for the data repositories associated with the service are applied.

In the previous paragraph, a response should be understood to mean a response (e.g. response Rs) which is transmitted from the node (e.g. node 100A) which received the original request (e.g. request Rq) back to the source of the original request (e.g. an external entity which transmitted the request Rq to the system 201 via node 100A).

A request transmitted in response to a request (e.g. request Rq) may be a further request transmitted from a node to an external entity which has registered at the node (e.g. on a list stored in the storage medium 105) to receive the request and process it externally. For example, if the service is a shared ledger, then an external entity which monitors the shared ledger and provides notifications to payees on the shared ledger when they receive a payment may register with a particular node and, upon a transaction undergoing successful consensus, that node will then transmit a request (generated by the shared ledger service and stored in the object in the gateway prior to consensus) to the external entity on the basis of which the external entity provides notification to the payee of the transaction. Whether the transaction is approved or refused (e.g. depending on the funds available to the payer) may be included in the new request transmitted to the external entity, for example.

The above-mentioned external response and/or request message(s) possibly generated on the basis of an initially received external request (e.g. request Rq) are generated at each node to which the message destination has registered as a result of executing the object. Thus, if an external service Z registers with the node network at node 100B, and a request Rq processed by the network requires a request (for example) message Rx to be sent to Z, when consensus is reached on that request Rq, that request message Rx will be sent to Z only by node 100B. All other nodes on the network will have included the response Rx to Z in their objects for that request Rq, but at the time of consensus all other nodes will not send it as Z's registration with node 100B would have itself been processed by consensus on the network and therefore be known by all nodes. However, an external response to the original request Rq is only transmitted by the node (e.g. node 100A) which initially received the external request Rq. This alleviates the use of network capacity for transmitting unnecessary request and/or response messages.

A further request Rq' transmitted in response to an original request (e.g. request Rq) may be also be a request to another service hosted by the node. In this case, upon successful consensus and execution of the object of Rq, the new request Rq' is passed internally within each node to the service with which Rq' is associated. The process of generating an object, checking consensus and executing the object upon successful consensus is then repeated. In this way, consensus for a request Rq requiring the execution of processing by multiple services (by the generation of further internal requests R') is checked at each stage of processing carried out by the respective service(s). This allows, for example, a lack of consensus (indicating a fault at one or more nodes) to be associated with a particular service, thereby helping the source of such a fault to be determined more easily.

In an alternative embodiment, internal requests at each node may be processed by their respective service prior to generation of the object. For example, original request Rq invokes service 1, which generates a further request Rq' executed by service 2, which generates a further request Rq" executed by service 3. Response(s), request(s) and data repository updates resulting from this entire chain of processing are then stored in a single object. It is this object which is then subject to consensus and which is then executed upon successful consensus. In this example, although a lack of consensus cannot be associated with a particular service (since there is only a single object generated as a result of processing by multiple services), the necessary amount of processing is reduced, since consensus using a single object (rather than multiple objects) is required in order for the original request Rq to be processed.

In an embodiment, a response to a request may carry a hash that is computed from the objects of multiple requests. This allows the node network to avoid having to carry out the consensus processing for every request processed by the network. Thus, a single hash from a node would cover multiple requests (regardless of the node these requests originated from). The hash in such cases would not be based on a single object string but rather on some simple function F of multiple respective object strings. Thus, the CHF result included in the response would be CHF[ F[ordered set of object strings for the requests concerned]+identity string of the sending node]. This may be referred to as a composite hash. The hash message would carry a flag to indicate that it comprises a composite hash and the range of the requests the composite hash covers. There may be a configurable limit as to the number of such responses that can be combined in this way. Consensus formation by (all) nodes receiving this composite response proceeds as with other responses except that each receiving node recognizes the composite nature of the hash (based on the flag and identified original request in the hash message) and computes the expected F result from multiple requests before computing the CHF result to compare with the received composite hashes in order to check consensus.

More generally, the role of the CHF may be performed by any Zero Knowledge Proof (ZKP) scheme in which the generated hash messages sent by nodes contain evidence of the object created for a request, such that nodes may confirm agreement between themselves and the sending node without being sent the actual object string created by the sending node.

Alternatively, the CHF created hash may be supplemented by, or entirely replaced by, a description of the sending node's object, including sending the complete object string. This would allow receiving nodes to determine agreement with the sending node and further, considering the wider consensus across the network, determine in detail where any consensus failure on the network had occurred (should this happen).

Again, the gateway 104 may be implemented using the processor 103 and storage medium 105. For example, the processing carried out by the gateway 104 may be carried out by the processor 103 and objects temporarily stored in the gateway 104 may be stored in the storage medium 105 within a separate logical partition to a logical partition in which data associated with the service hosted by the node (e.g. data indicative of the shared ledger when the service is a shared ledger service) is stored.

In an embodiment, the network 201 may comprise multiple hubs 101 which are maintained by an operator of the network. Each hub receives all traffic from all nodes 100A to 100F with one hub being selected by the operator as the active hub (the active hub being the only hub which transmits traffic out to the nodes at a given time). In the case of failure of the active hub, a different one of the multiple hubs is selected as the active hub. Disruption to the network operation in the case of a hub failure is therefore reduced, since all each node has to do following a failure of the active hub is to establish a receive channel with the different hub selected as the new active hub and to receive any data held by that hub. Each non-active hub may temporarily store the latest set of received messages (e.g. Rq or #1, #2, #3, #4, #5 and #6) in its storage medium 108 until the next set of messages is received. In the case that the operator activates one of the non-active hubs (so that the non-active hub becomes the active hub), the stored latest set of received messages (which will not have been transmitted to all of the nodes in the case of a failure of the previous active node) can therefore be transmitted to each of the nodes. Interruption to the network traffic is therefore reduced. Alternatively, all hubs can receive and transmit all messages transmitted between the nodes (e.g. Rq, #1, #2, #3, #4, #5, #6). Each node may then disregard multiple copies of the same message. By having multiple hubs in this way, the resilience of the network is improved.

Each data communication channel 200A to 200F allows data to be transmitted from the hub 101 to a respective one of the nodes 100A to 100F (on an output channel) and from a respective one of the nodes 100A to 100F to the hub 101 (on an input channel). Upon a node losing a connection to the active hub 101 via one or both of its input/output channels, the node determines that the active hub has changed. The node thus initiates a connection to the different hub which is now the active hub. The connection may be initiated using the same network address (this being, for example, the network address of a routing device (not shown) which routes data to/from the new active hub as selected by the operator) or using a new network address (this being, for example, the network address of the new hub). In the latter case, each node may store in its respective storage medium 105 a list of network addresses of the respective hubs in a predetermined order. In the case that an input/output connection with the current active hub is lost, a new connection is established using the network address of the next hub on the list, this next hub being the new active hub.

In an embodiment, each hub 101 is a computer system running, for example, a software relay service or a media streaming service with the node traffic being streamed to all the nodes. Alternatively, each hub 101 may be a network device specifically purposed to this task of routing traffic between nodes in the way as described.

In an embodiment, in order to alleviate interruption of the operation of the network in the case of a node failure/node restart (as may be necessary in order to implement node software updates or the like), each party holding a node may hold multiple nodes. In the case of a node failure/restart, once operation of the node is restored, as long as a record of the state of the shared service data stored in the storage medium 105 of the node prior to the failure/restart is known, this shared service data can be brought into synchronization with that of the other nodes (which remained operational throughout the time during which the node is question was non-operational) by transmitting all data transmitted through the hub whilst the node was non-operational to the node (ensuring that the data is transmitted to the restarted node in the same order as previously transmitted to the other nodes). In this case, during the time in which the node is non-operational, a copy of all data transmitted through the active hub may be stored in the storage medium 108 of the active hub. Once the node becomes operational again, this stored data is then transmitted to the node, thereby allowing the shared data to be updated and brought into synchronization with that of the other nodes. Whilst the node is updated, it may be put in an update mode in which messages which would normally be transmitted out by the node (e.g. hashes sent to other nodes or requests/responses transmitted to external entities) are not actually transmitted (although all other processing by the service is carried out so as to ensure that the data repository of that service is brought up to date). This occurs when, during the node's down time, the processing that would have been carried out by that node is carried out by another node (e.g. backup node) and therefore it is undesirable for duplicate messages to be sent out by the restored node. Potential confusion on the network 201 and/or unnecessary use of network resources caused by duplicated messages is therefore alleviated.

As mentioned above, the present technique can be applied to help ensure synchronization between any kind of shared service provided by a plurality of connected nodes. In another example, each node hosts the same set of scripts which implement the same business logic. This allows smart contracts (that is, contracts implemented automatically via computer code) to be implemented by the nodes and for synchronized data relating to those smart contracts to be stored at each of the nodes.

It will be appreciated that the present technique has many potential applications. Some example applications are now given.

In one example, the present technique is used for database synchronization. In this example, the network 201 provides a service in which multiple copies of the same data repository are updated. Each data repository copy is implemented as a regular, separate database at each respective node. The databases are kept in synchronization with the present technique. Such an arrangement may be achieved by implementing a database driver, such as a JDBC (Java Database Connectivity) driver, at an external device from which a request Rq is received by a node of the network 201. The database driver makes requests Rq to a service hosted by the network 201. The service would then read and update the local database copy as described above for any service updating one of its repositories, producing responses Rs to the database driver in a form that presented the outcome as if the service were itself a regular database management system. With the present technique, as long as the object string generated for reads from and updates to the data repository is the same for each node (thereby allowing the consensus processing to occur), the format of the data repository at each node can be different for different respective nodes. This provides improved flexibility of the system, since it allows consensus based updates to synchronize different types of data repository. It is noted that the term "data repository" should be understood to mean a set of data used by and/or updatable by one or more shared services. The data repository can take the form of a database, one or more electronic files or any other suitable format. Thus, the ability to synchronize different types of data repository might include, for example, synchronizing the same data repository held in an Oracle DBMS at 2 nodes on the network, held in an IBM DB2 database at another node, and held in flat files at all other nodes.

In another example, the present technique is used in a mission critical system in which it is critical that data associated with a particular service is always up-to-date and correct. The present technique may therefore be used to host multiple copies of the same service (on a plurality of respective nodes). It can thus be ensured that responses to requests transmitted to the service hosted by the network 201 have all been confirmed by consensus. A failure of consensus implies a fault with a part of the system (e.g. one or more of the nodes or even the hub itself) which can therefore be investigated. Conversely, successful consensus implies that all parts of the system are working correctly and can therefore be relied upon.

In another example, it is noted that, with the present technique, since the nodes of the network 201 are separately administered, any number of commercial applications may be easily administered using the network. These include, for example, those relating to stock trading, commercial banking, merchant banking, and the like. In this case, the network 201 (or just the network hub 101) may be administered by a disinterested third party operator to allow the stakeholders to interact with the services provided by the network 201 and to allow them, where appropriate, to participate with respect to those services by hosting one or more of the nodes. The use of consensus provided by the present technique allows such services to be hosted collectively by all node operators without dependence on one organization.

In another example, a web server is hosted at each node. A connection to a given node is then established using a regular web browser which issues HTTP (HyperText Transfer Protocol) requests to one of the nodes. The receiving node converts such requests into requests Rq that can be processed as described above by the network. These Rq are then submitted to the other nodes on the network via the hub 101. Such requests are processed by the web server service hosted by the nodes, a response is agreed by consensus and the response is returned via the original receiving node to the requesting web browser (the response being converted into an HTTP response at this point). In this case, the network may act as a static content web server, a dynamic content web server or a web proxy (as long as the response relied on by any external site can be agreed by consensus of the nodes).

In another example, the consensus processing elements of a network node are supplied as a component in a software messaging framework such as Apache Camel. This would allow the consensus functionality of the network 201 (and its described characteristics) to be rapidly integrated into new, independently hosted, private networks.

Figure 6:
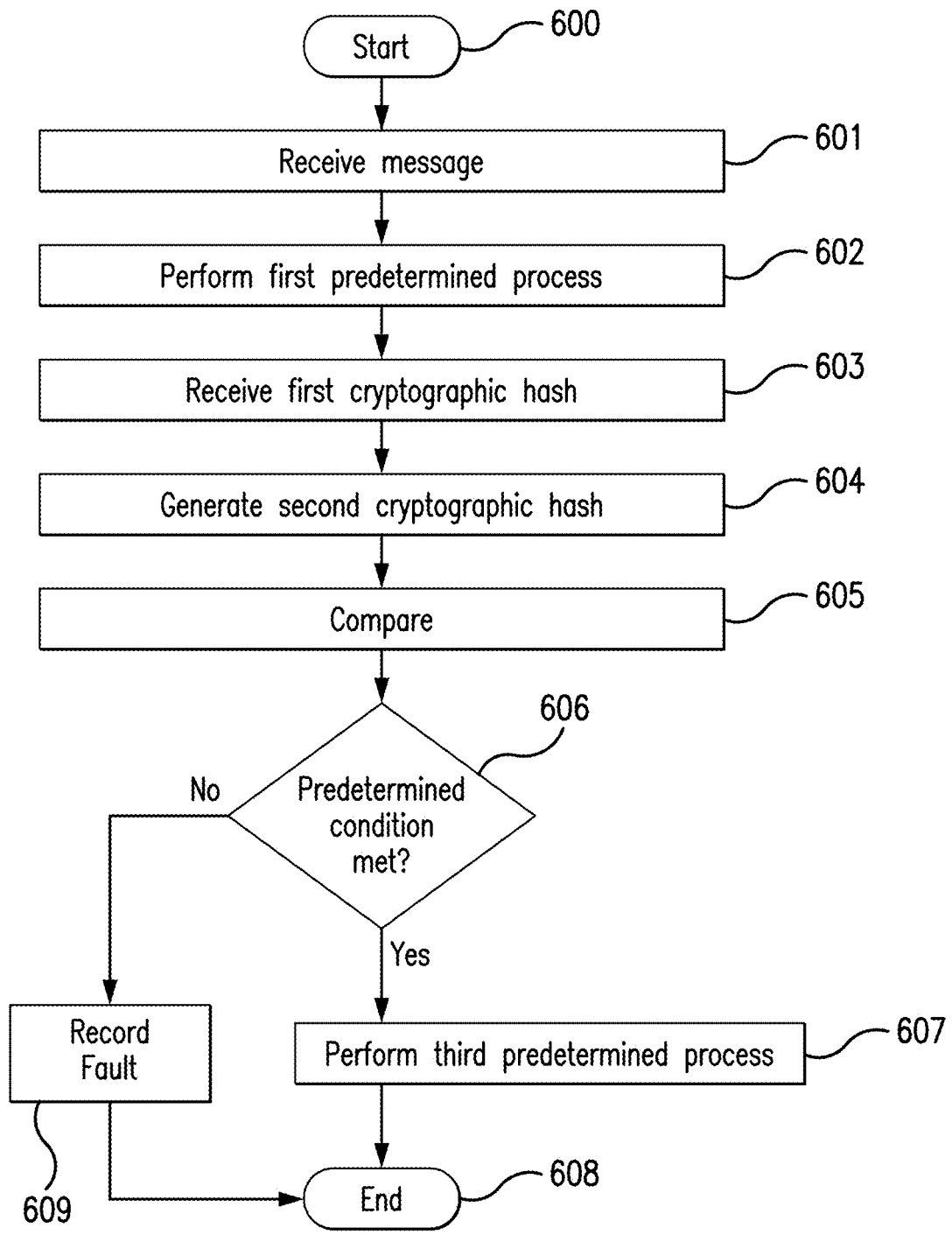
FIG. 6 shows a flow chart illustrating a further data processing method.

FIG. 6 shows a flow chart showing a general process according to an embodiment. The process of FIG. 6 is executed by the processor 103 of each of the nodes 100A to 100F. The process executed by the processor 103 of node 100A is exemplified here.

The process starts at step 600. At step 601, the communication interface 102 is controlled to receive an electronic request message (for example, Rq) from the hub 101. At step 602, the processor 103 performs a first predetermined process using the electronic request message to generate first electronic information (the first electronic information being, for example, a first object generated using the data contained within Rq).

At step 603, the communication interface 102 is controlled to receive, from each of one or more data processing devices D (in this case, nodes 100A to 100F), a respective first cryptographic hash (for example, #1, #2, #3, #4, #5 and #6), the first cryptographic hash received from each data processing device Dx of data processing devices D being a cryptographic hash of a combination of the first electronic information generated by Dx and an identifier of Dx.

At step 604, the processor 103 generates, for each of Dx, a respective second cryptographic hash (for example, #1', #2', #3', #4', #5' and #6'), the second cryptographic hash being a cryptographic hash of a combination first electronic information generated by the processor 103 and an identifier of Dx.

At step 605, the processor 103 compares, for each Dx, the first cryptographic hash with the corresponding second cryptographic hash, wherein the first cryptographic hash of Dx is known to match the second cryptographic hash of Dx when the first electronic information generated by the first predetermined process by processor 103 matches the first electronic information generated at Dx by the first predetermined process performed by Dx.

At step 606, it is determined whether the collection of matches between the first cryptographic hash and second cryptographic hash for each Dx meet a predetermined condition (for example, it is determined whether there are more than a predetermined number of matches between #2 and #2', #3 and #3', #4 and #4', etc.). If it is determined that the predetermined condition is not met, then it is determined that there is no consensus and a fault is recorded (e.g. in the storage medium 105 of the node) at step 609. The occurrence of the fault may be indicated in an external response Rs, for example. The process then ends at step 608. On the other hand, it if is determined that the predetermined condition is met, then the process proceeds to step 607, in which the processor 103 performs a third predetermined process using the first electronic information in response to the electronic request message (for example, the third predetermined process comprises executing processing based on the first object generated using the data contained within Rq). The process then ends at step 608.

In embodiments, the service associated with a particular request Rq is identified by a service identifier (e.g. the name of the service or a code uniquely associated with the service) comprised within the request. This allows each node to pass the request Rq to the correct service when it is received. For malformed messages (e.g. those not containing sufficient information or not being in a suitable format for an appropriate service to be identified), each node may host the same special service for processing such malformed messages. Malformed messages received by a node are therefore passed to this malformed message service, which generates an object based on the message (for example, the object may comprise information identifying the reasons why the message is deemed malformed—e.g. "no service identified", "unknown format", or the like). The contents of this object are then confirmed by consensus and a response Rs is transmitted to the external entity from which the malformed request Rq was received indicating that the request Rq could not be processed. This is another example in which a request is refused but when that refusal is, itself, nonetheless confirmed by consensus.

FIGS. 7, 8, 9A and 9B show example processes carried out by each of the nodes 100A to 100F of the present disclosure.

Figure 7:
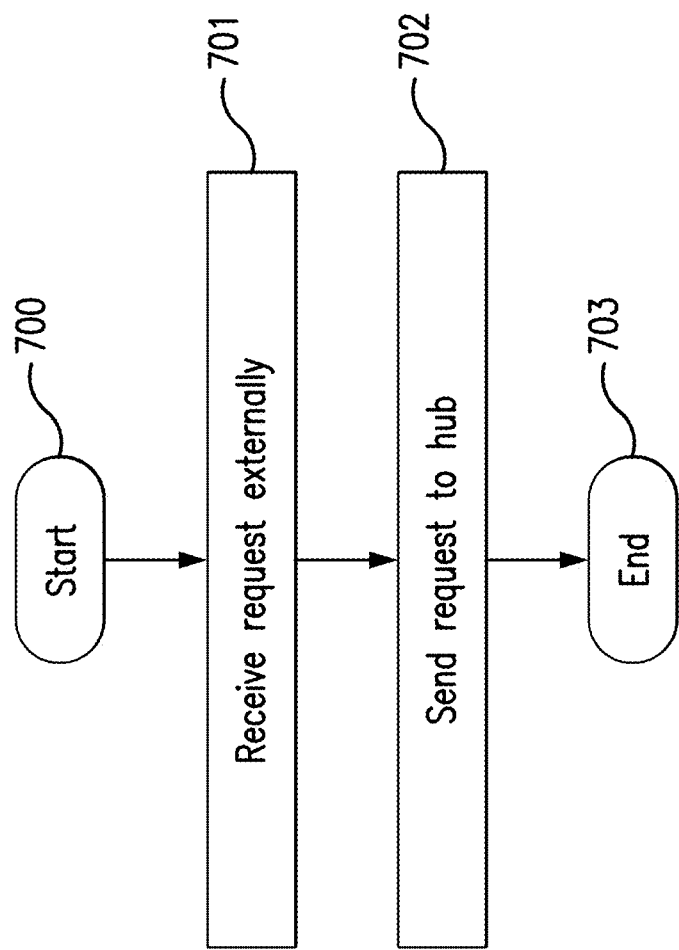
FIG. 7 shows a flow chart illustrating a method in which a node receives an external request.

FIG. 7 shows an example process in which a node receives a request Rq from an external entity. The process starts at step 700. At step 701, the communication interface 102 receives the request Rq from an entity external to the network. At step 702, the communication interface 102 transmits the request Rq to the hub 101. The process ends at step 703.

FIG. 8 shows an example process in which a node receives (801) the request Rq from the hub 101 and a service hosted by the node processes (802) the request to produce an object. An object string is then created based on the object, is cryptographically hashed (803) and is transmitted (804) to the hub 101.

The process starts at step 800. At step 801, the communication interface 102 receives the request Rq from the hub 101. At step 802, the processor 103 processes the request Rq in accordance with an appropriate service hosted by the node. Software code for implementing each service is stored in the storage medium 105 and is executed by the processor 103 in accordance with data comprised within the request Rq in order for the request Rq to be processed. The processing of the request Rq generates an object. The object is electronic information indicating zero one or more of an update to a data repository associated with the service stored in the storage medium 105, one or more responses (including the response Rs to the request Rq and a response to each of any further externally received requests preceding request Rq whose outcome depended on the request Rq) and one or more further requests (to be transmitted to one or more external entities connected to the network 201 via a respective node of the network to notify those external entities of the outcome of the request Rq). The object is stored in the gateway 104. At step 803, an object string is generated from the object and a cryptographic hash of a combination of the object string and an identifier of the node is generated. At step 804, the communication interface 102 transmits the hash to the hub 101. The process ends at step 805.

Figure 9A:
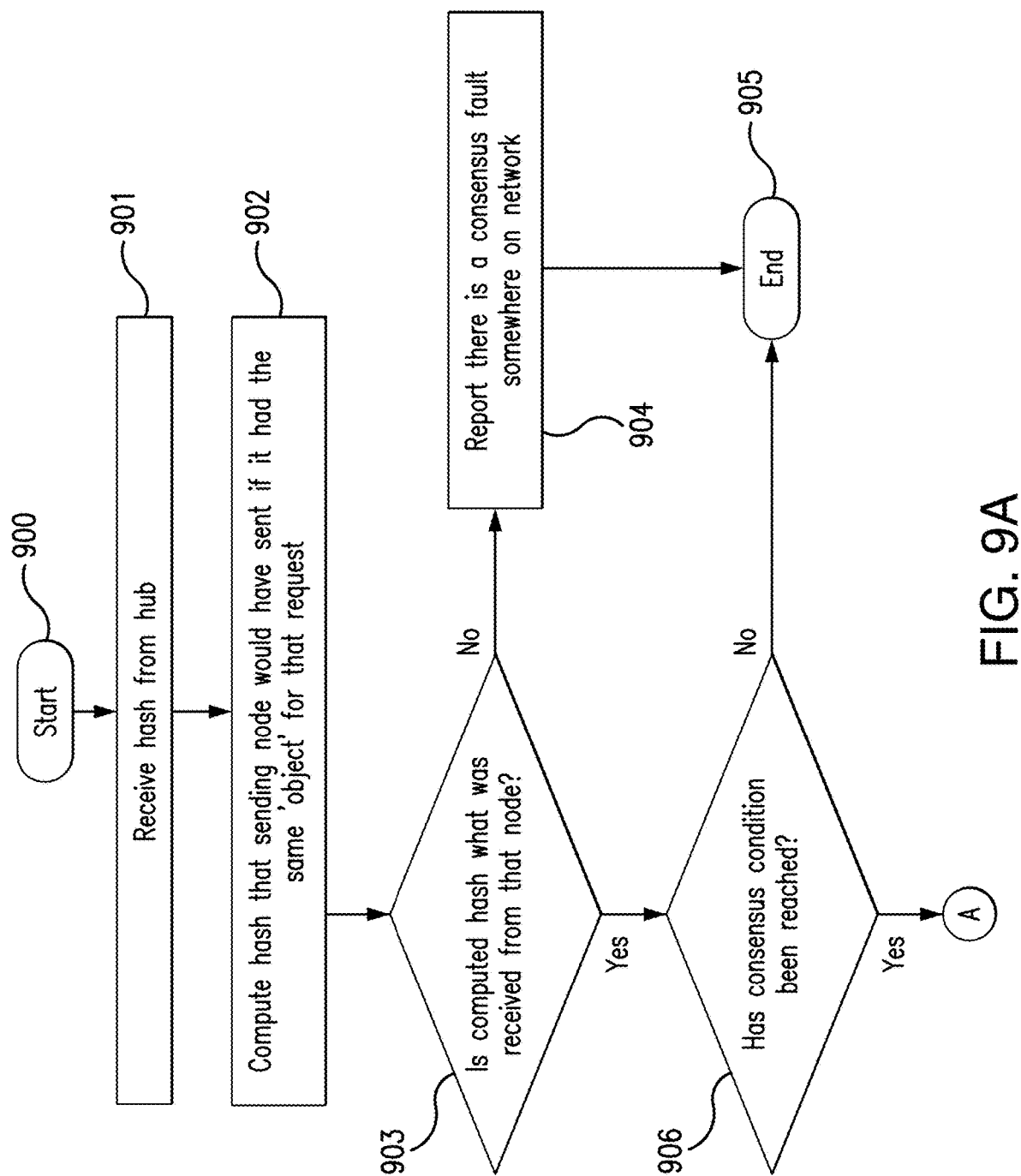
FIGS. 9A and 9B show flow charts illustrating a method for determining consensus between a plurality of nodes.
Figure 9B:
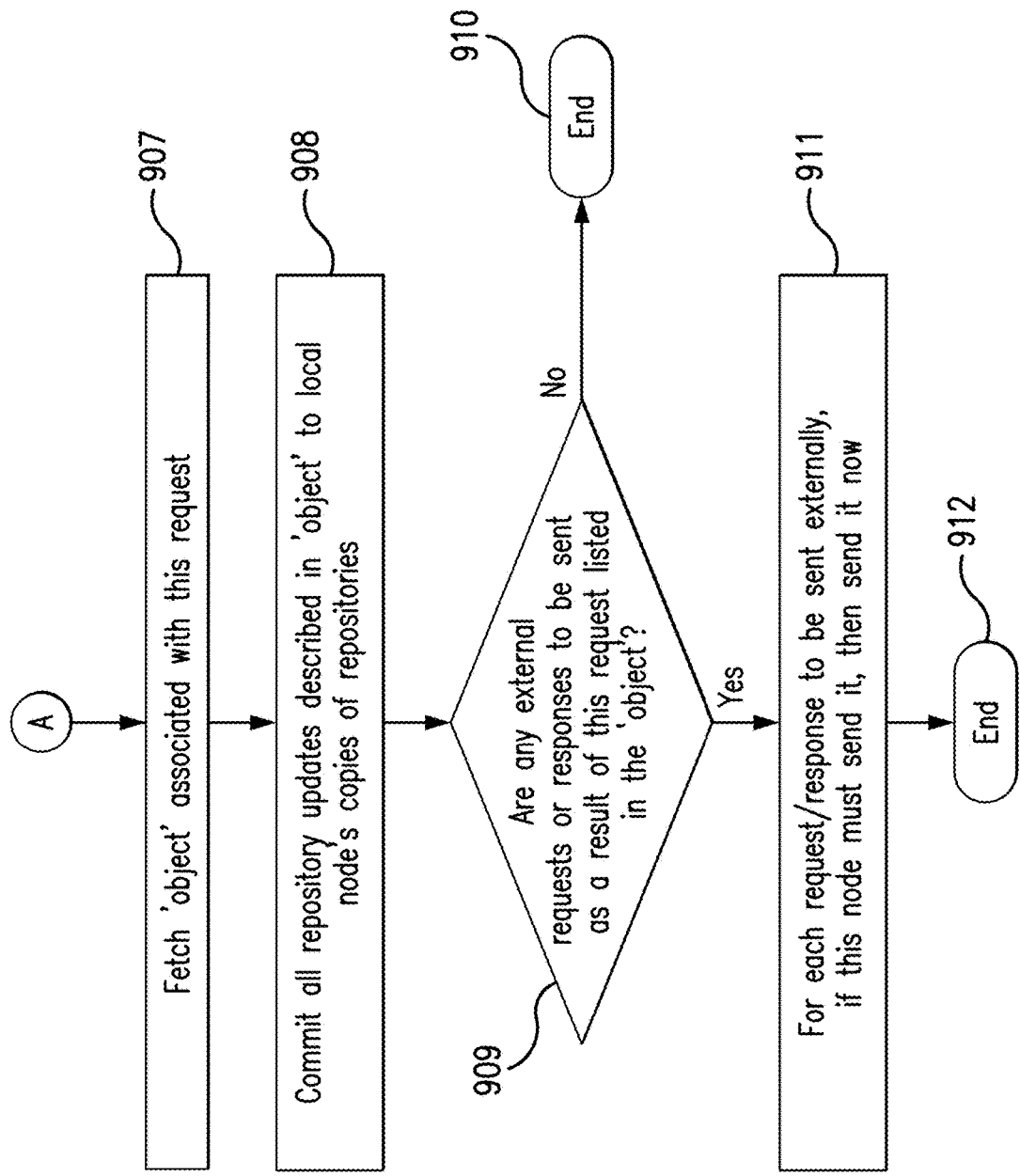

FIGS. 9A and 9B show an example process in which the node completes execution of the request Rq by executing the object (or not) depending on whether consensus is reached. The process starts at step 900. At step 901, the communication interface 102 receives a hash from another (or the same) node via the hub 101. The hash is comprised within a hash message identifying the node from which it was sent. At step 902, the processor 103 computes the hash that this other node would have sent if the same object as generated by the current node was generated by the other node based on the request Rq.

At step 903, the processor 103 determines whether the generated hash and the received hash match. If the hash does not match at step 903, then this indicates a fault at one of the nodes (either the current node or other node from which the hash is received). At step 904, the fault is recorded in an audit log stored in the storage medium 105 and the communication interface 102 transmits a message indicative of the fault to a network administrator, thereby allowing the fault to be investigated. In this case, the object in the gateway 104 is not executed (and thereby the processing of the request Rq is aborted). The process then ends at step 905. In this case, the object may still be executed by the other nodes (as long as the overall consensus condition is met, e.g. majority of nodes agree, all but one node agrees, etc.). However, the current node does not execute the object.

If the hash does match at step 903, then the process proceeds to step 906, in which it is determined whether the overall consensus condition is met. If the overall consensus condition is not met, then the process ends at step 905 and the object is not executed by the node. Each node may record the consensus failure in its respective audit log and one or more of the nodes (e.g. all of the nodes or a specific node (or other network element) configured in advance) may transmit a message indicating the consensus failure to an administrator of the network 201 for further investigation.

In the case of a hash match failure of the current node but the consensus condition nonetheless being met (e.g. if the consensus condition is that a majority of nodes agree and the nodes for which there was a hash match failure form part of the minority), this may be referred to as a low level consensus failure. Execution of the object is carried out at the nodes for which there was consensus with all other nodes and the response Rs transmitted to the external entity from which the request Rq was received will be a response resulting from the execution of the object (in this case, another node which was able to execute the object may forward the response Rs to the current node for the current node to then forward this response to the external entity). On the other hand, if the consensus condition is not met, this may be referred to as a high level consensus failure. Execution of the object is therefore aborted for all nodes and the response Rs transmitted to the external entity indicates that processing of the request Rq was not carried out due to a high level consensus failure.

If the overall consensus condition is met, then the process proceeds to step 907 in which the processor 103 fetches the object associated with the request from the gateway 104 and executes the object. Execution of the object means one or more of updating one or more relevant data repositories as indicated by the object, transmitting a response(s) Rs as indicated by the object to the external entity from which the corresponding request(s) Rq were originally received and transmitting any further requests as indicated by the object to one or more external entities registered with the node to receive such requests. The repository update(s) occur at step 908. At step 909, it is determined whether an external response Rs or any further external requests need to be transmitted. If no, then the process ends at step 910. If yes, then the process proceeds to step 911 in which the communication interface 102 transmits the response Rs and any such further requests. In general, the node which received the original request Rq from the external entity will transmit the response Rs and any further external request(s) will be transmitted to an external entity in general if that external entity has registered with the node in advance to receive such external requests (each node may comprise, for example, a database stored in the storage medium 105 defining which external entities are to receive external requests from that node for each service hosted by the node). The process then ends at step 912.

In examples of the present technique, the audit log at each node comprises, for each message Rq received from the hub 101, (a) a copy of the object generated by the node in response to the request Rq, (b) the object string generated from the generated object, (c) the cryptographic hash received from each other node along with the identifier of each other node and (d) the digitally signed hash message containing the cryptographic hash from received from each of the other nodes. This allows the fact that consensus occurred for the processing of any given request Rq to be independently verified at any given node by simply looking up the audit log record for the request Rq concerned and checking that the hashed combination of the object string generated by that node and identifier of each of the other nodes matches the hash received from each of those respective other nodes (at least to the extent that the predetermined consensus condition was met). The audit log of each node is stored in the storage medium 105 (again, in a separate partition to the partition in which objects are stored and the partition in which the data repositories associated with the services hosted by the node are stored).

In the above-mentioned examples in which the shared service is a shared ledger, to know if allowance of the request is possible, the execution of the request needs to be able to read the shared ledger. However, it can't read the actual shared ledger because it may be out-of-date (it's only updated after consensus). So, the gateway has to maintain a second copy of the shared ledger (this is referred to as a working copy) for use during execution of the request. Further, the execution of the request updates the working copy of the shared ledger directly. Thus, executing the request creates the object (which contains any updates for the shared ledger proper), but also updates the working copy of the shared ledger straight away. Because the requests Rq are executed in the order in which they are received from the hub by all nodes and any updates to the shared ledger as a result of a request are applied to the working copy of the shared ledger at that node before the next request from the hub is executed, the working copy of the shared ledger at all nodes is kept synchronized (thereby allowing consensus to occur when the outcome of one request on the shared ledger affects the outcome of another request on the shared ledger). Updates to the working copy of the shared ledger at each node therefore always happen immediately after execution of a request and updates to the shared ledger proper are defined in the object and occur immediately after consensus occurs. The working copy of the shared ledger forms part of the gateway 104.

The concept of a working copy of a shared ledger may be extended to any other repository used by a shared service hosted at the nodes. Firstly, again, the gateway must maintain a working copy of each of the repositories. Services wanting information from the repositories during process of a request get this information by reading from these working copies. When the service writes, or otherwise updates, a repository, two things happen: (i) the working copy of that repository is immediately updated and (ii) a description of the update to the repository is held in the object in the gateway (to be applied to the repository proper if the request is allowed and if consensus occurs). So, the working copy of the repository is updated straight away, while updates to the copies of the repository proper at each node are only applied after consensus for that request has occurred.

Although, in the above-mentioned embodiments, a cryptographic hash is generated from each object (e.g. CHF [object string+node ID]), this is not necessary. More generally, each node needs to be able to compare a characteristic of the object generated for each request message with a corresponding characteristic of the object generated for that request message by each of the other nodes in the system such that, when those characteristics match, the node knows that the object generated by that node and the object generated by the other node for which there is a match are the same. A cryptographic hash in the way described is an example of a characteristic of the object, since the cryptographic hash received from one node will only match a generated cryptographic hash for that node at another node when the object itself is the same. Any suitable alternative characteristic may be chosen. For example, the object strings generated from respective objects generated at each node may be compared directly (in which case, the object strings themselves are the respective characteristics of the objects). Such data which is characteristic of an object (e.g. a cryptographic hash, the object string, etc.) may be referred to as characteristic data.

Figure 10:
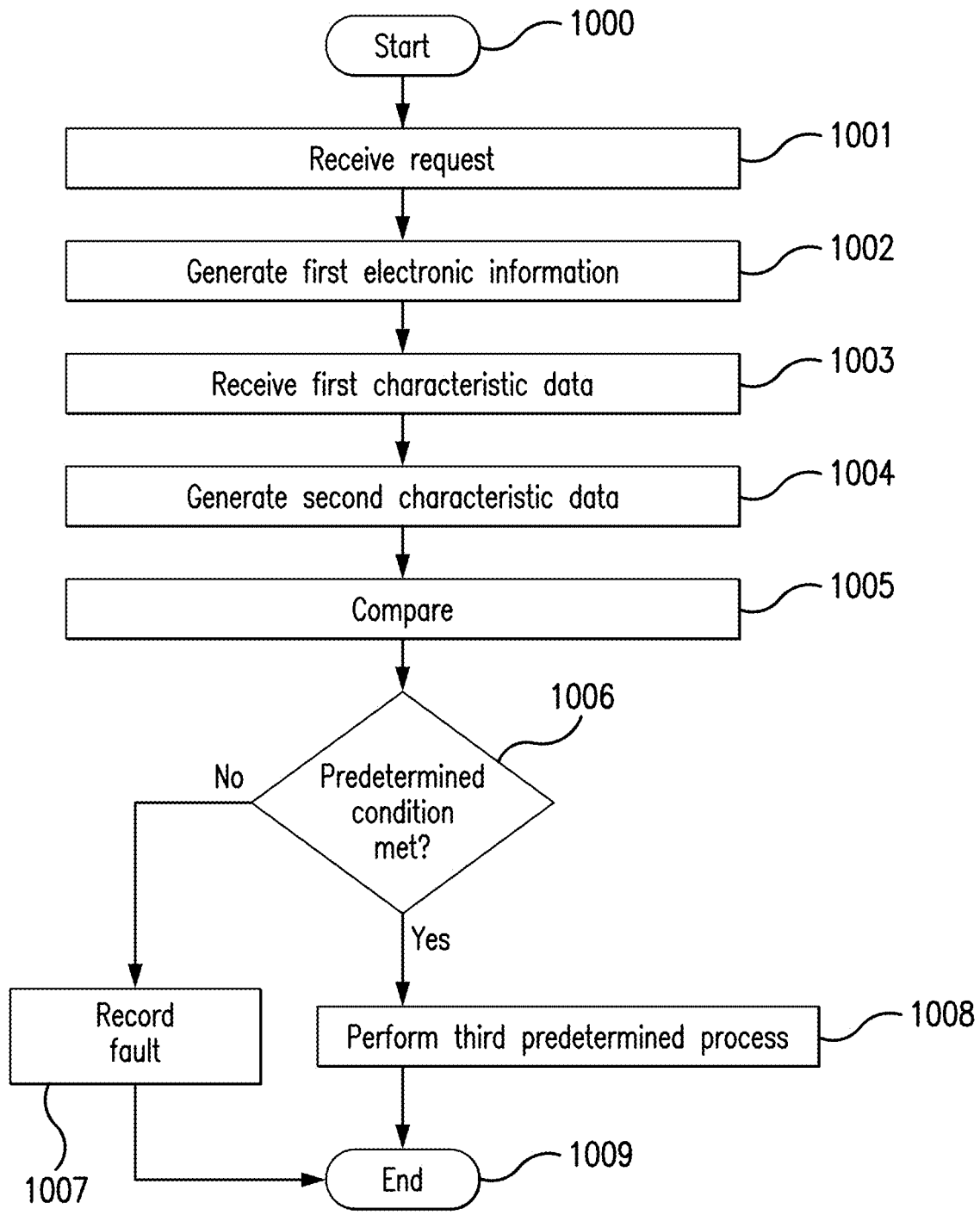
FIG. 10 shows a flow chart illustrating a generalized data processing method.

FIG. 10 shows a more general method implemented by the node 100A. It will be appreciated that a corresponding method is implemented by each of the other nodes 100B to 100F. The process starts at step 1000. At step 1001, the communication interface 102 receives an electronic request message (e.g. Rq). At step 1002, the processor 103 performs a first predetermined process using the electronic request message to generate first electronic information (e.g. an object). The first electronic information is stored in the gateway 104. At step 1003, the communication interface 102 receives, from each of the other nodes 100B to 100F, respective first characteristic data (e.g. cryptographic hash, object string or the like) characteristic of respective second electronic information (e.g. an object) generated by that other node performing a respective second predetermined process using the electronic request message. At step 1004, the processor 103 generates, for each of the other nodes 100B to 100F, respective second characteristic data (e.g. cryptographic hash, object string or the like) characteristic of the first electronic information. At step 1005, for each of the nodes 100B to 100F, the processor 103 compares the first characteristic data with the second characteristic data. At step 1006, it is determined whether one or more matches between the first characteristic data and second characteristic data for the other nodes 100B to 100F meet a predetermined condition. If the predetermined condition is met, then it is determined that there is consensus and the process proceeds to step 1008, in which the processor 103 performs a third predetermined process using the first electronic information (e.g. the processor implements the processing outcome represented by the object stored in the gateway 104). Any response message Rs will indicate the processing outcome (which is an outcome of processing the original electronic request message). The outcome may be positive or negative but, either way, will have been validated by consensus. The process then ends at step 1009. If the predetermined conditions are not met, then it is determined that there is no consensus and the process proceeds to step 1007, in which a consensus fault is recorded (e.g. in the storage medium 105) for later investigation. Any response message Rs will indicate that the processing of the original electronic request message was not completed due to the lack of consensus. The process then ends at step 1009.

In the above-mentioned embodiments, it is possible that an object generated for a request Rq comprises none of a response, request or repository update. For example, there are two types of situation in which a request's object may need to contain none of a response, request or repository update. The first case is when the request can't be completed for some reason, and needs to be completed as part of the execution of some other request. The second case is when the request itself normally results in no response being sent.

An example of the first case is if a payment request can't be completed as it is 'blocked' waiting for liquidity (i.e. the payer does not yet have sufficient liquidity for the payment to be completed). In this case the request will execute (to generate an object), but cannot yet send a response or request or update the relevant repository (because the payment cannot yet be made). The object therefore cannot contain a response, request or repository update. Another request may later then provide sufficient liquidity for that payment (and potentially many others). For example, the later request may be a payment request to the payer who issued the first payment request which provides sufficient liquidity to this payer for their first instructed payment to now be completed. The gateway object for this later (liquidity providing) request will then contain the responses for all previously 'blocked' payments (including the payment instructed by the first payment request). The clients (external to the node network) that sent their payment requests to the network, will then all receive their responses (as it seems to them) in response to their original requests.

An example of the second case is if the network sends an external 'request' to a system outside the network that is simply a notification of some condition of the network (e.g.

the status of a node of the network). The outside system may then respond with an acknowledgement message that basically just acknowledges receipt of the notification. This acknowledgement is processed by the node network just like a request, since it needs to be processed by consensus. Assuming there is no error status in the acknowledgement, an acknowledgement of this form will simply be logged at each node (in order to confirm to each node that the notification sent outside the network has been acknowledged). This logging may be in the form of a repository (that tracks outstanding unacknowledged notifications sent, for example) which is updated. However, it will be appreciated that, as long as each node is able to confirm that an acknowledgement message has been received (even if this is not permanently recorded in a log), a response, request or repository update is not required. An object generated from the acknowledgement message (for consensus) therefore need not contain any response, request or repository update.

Thus, more generally, an object generated from a message received by the network 201 will describe zero or more responses, and zero or more requests, and zero or more repository updates. The message and/or object may nonetheless result in receipt of the message being logged by each node (as a record in the storage medium 105, for example) and/or the occurrence and details of consensus being logged by each node (as a record in the storage medium 105, for example), even if no responses, requests or repository updates are indicated by the object of the message.

In the above-mentioned embodiments, a first node (node 'A') is currently described as comparing the hash (or other characteristic data) sent from a second node (node 'B') with the hash (or other characteristic data) that A computes B would have sent if it had the same object. If there is a match, then A concludes that B had the same object string and hence the same object. This may be achieved by lossless creation of characteristic data from an object. That is, the overall function going from object to characteristic data (the characteristic data being what is compared by the nodes in order to determine consensus) is lossless, i.e. throws away no information contained in the object. When such a lossless characteristic data conversion is used, it can be concluded that, when a first node performs comparison of characteristic data with a second node and finds a match, the second node must have generated the same gateway object as the first node.

However, alternatively, the overall function from object to characteristic data might be lossy, i.e. may throw away information contained in the object. This is the case with most cryptographic hash functions that include a digest step. In this case, the fact that a first node computes the same characteristic data as that received from a second node does not imply that the original object must have been the same for the nodes (because some of the information contained in each object is lost during the creation of the characteristic data, there is no accounting for this information in the characteristic data comparison). Rather, it can only be concluded that it is likely that the generated objects were the same. However, as long as the likelihood of a match of characteristic data implying a match of the corresponding objects is sufficiently high (i.e. the likelihood of false matches is sufficiently low, false matches occurring when there is a match of characteristic data despite the fact that the underlying objects from which that characteristic data is generated do not match), then the above-described consensus processing may still be relied on, even if a lossy function for converting the object into characteristic data is used.

Thus, in an embodiment, a length (size in bits) of the created characteristic data may be selected such that it is an acceptable length for transmission over the network (e.g. not so long as to create an undesirably high amount of network traffic) and such that the likelihood of false characteristic data matches is acceptable (e.g. not so short that false matches become unacceptably likely). It is noted that, for a node network creating lossy characteristic data x bits in length from each object, each message comprising the characteristic data for comparison will be at least x bits and the probability of a false agreement between two nodes (not a false consensus overall across the network) occurring will be $2^{-x}$. In an embodiment, the administrator of a node network may configure the nodes in advance to work using either a lossless or a lossy mode of operation. In the case of lossy operation, the administrator must also select a size (x) of characteristic data (and hence level of certainty of match) appropriate to the application (balancing the need for reduced network traffic with the need for a certain level of certainty for matches during the consensus processing).

It will be appreciated that the use of a lossless operation to generate characteristic data gives the highest possible certainty for matches (and thus the most robust consensus). However, the use of a lossy operation to generate characteristic data allows network traffic to be reduced.

Some embodiments of the present technique are defined by the following numbered clauses:

Clause 1. A first data processing device comprising circuitry configured to:

receive an electronic request message;

perform a first predetermined process using the electronic request message to generate first electronic information;

receive, from each of one or more second data processing devices, respective first characteristic data of respective second electronic information generated by that second data processing device performing a respective second predetermined process using the electronic request message;

generate, for each of the one or more second data processing devices, respective second characteristic data of the first electronic information;

compare, for each of the one or more second data processing devices, the first characteristic data with the second characteristic data, wherein the first characteristic data of each second data processing device is known to match the second characteristic data of that second data processing device when the first electronic information matches the second electronic information generated by that second data processing device; and when one or more matches between the first characteristic data and second characteristic data for the one or more second data processing devices meet a predetermined condition, perform a third predetermined process using the first electronic information.

Clause 2. A first data processing device according to clause 1, wherein:

the first characteristic data received from each second data processing device is a first cryptographic hash generated by cryptographically hashing data generated using a combination of the second electronic information generated by that second data processing device and an identifier of that second data processing device;

the second characteristic data generated for each second data processing device is a second cryptographic hash generated by cryptographically hashing data generated using a combination of the first electronic information and an identifier of that second data processing device.

Clause 3. A first data processing device according to clause 1 or 2, wherein:

the first predetermined process comprises execution of a service using information contained within the electronic request message and the first electronic information is a first object comprising the outcome of the execution of the service;

the second predetermined process comprises execution of the service using information contained within the electronic request message and the second electronic information is a second object comprising the outcome of the execution of the service; and the third predetermined process comprises implementing the outcome of the execution of the service comprised within the first object.

Clause 4. A first data processing device according to clause 3, wherein implementing the outcome of the execution of the service comprises generating a response to the electronic request message to be transmitted to a predetermined third data processing device.

Clause 5. A first data processing device according to clause 3 or 4, wherein implementing the outcome of the execution of the service comprises generating a further electronic request message to be transmitted to a predetermined fourth data processing device.

Clause 6. A first data processing device according to any one of clauses 3 to 5, wherein implementing the outcome of the execution of the service comprises changing electronic data in an electronic data repository.

Clause 7. A first data processing device according to clause 6, comprising a storage medium, wherein:

the storage medium stores a first copy of the electronic data repository, the first copy of the electronic data repository being inaccessible to each of the one or more second data processing devices, and a second copy of an electronic data repository, the second copy of the electronic data repository being replicated across each of the one or more second data processing devices;

the first predetermined process comprises changing electronic data in the first copy of the electronic data repository; and the third predetermined process comprises changing electronic data in the second copy of the electronic data repository.

Clause 8. A first data processing device according to clause 6 or 7, wherein the electronic data repository comprises a shared ledger and the electronic request message comprises a request to add a transaction to the shared ledger.

Clause 9. A first data processing device according to any one of clauses 6 to 8, wherein the electronic data repository is a database and the electronic request message is received from a third data processing device via database driver implemented at the third data processing device.

Clause 10. A first data processing device according to any preceding clause, wherein the predetermined condition of one or more matches between the first characteristic data and second characteristic data for the one or more second data processing devices is that there is a match between the first characteristic data and second characteristic data for at least a predetermined number or proportion of the one or more second data processing devices.

Clause 11. A first data processing device according to any preceding clause, wherein the predetermined condition of one or more matches between the first characteristic data and second characteristic data for the one or more second data processing devices is that there is a match between the first characteristic data and second characteristic data for a predetermined subset of the one or more second data processing devices.

Clause 12. A first data processing device according to any preceding clause, wherein the circuitry is configured to timestamp the first electronic information, wherein a current time used to timestamp the first electronic information is calculated deterministically using timestamps of a most recent message transmitted from the first data processing device to the one or more second data processing devices and a most recent message respectively received from each of the one or more second data processing devices.

Clause 13. A first data processing device according to clause 12, wherein the current time used to timestamp the first electronic information is calculated using a median value of the timestamps of the most recent message transmitted from the first data processing device to the one or more second data processing devices and the most recent message respectively received from each of the one or more second data processing devices.

Clause 14. A first data processing device according to clause 12 or 13 wherein, if a candidate current time calculated deterministically using the timestamps of the most recent message transmitted from the first data processing device to the one or more second data processing devices and the most recent message respectively received from each of the one or more second data processing devices is before a previous time used for a previous timestamp, the current time is calculated to be equal to the previous time or after the previous time by a predetermined amount.

Clause 15. A first data processing device according to any preceding clause, wherein:

the first characteristic data of the second electronic information generated by each of the second data processing devices is generated from the second electronic information using a lossless operation; and the second characteristic data of the first electronic information generated by the first data processing device is generated from the first electronic information using a lossless operation.

Clause 16. A first data processing device according to any one of clauses 1 to 14, wherein:

the first characteristic data of the second electronic information generated by each of the second data processing devices is generated from the second electronic information using a lossy operation; and the second characteristic data of the first electronic information generated by the first data processing device is generated from the first electronic information using a lossy operation.

Clause 17. A data processing system comprising a plurality of first data processing devices according to any preceding clause, wherein, for each of the first data processing devices, the other first data processing devices are each configured to act as a respective one of the one or more second data processing devices.

Clause 18. A data processing system according to clause 17, wherein the circuitry of a first one of the plurality of first data processing devices is configured to receive the electronic request message from a third data processing device and to transmit the electronic request message to each of the other first data processing devices.

Clause 19. A data processing system according to clause 18, wherein the circuitry of the first one of the plurality of first data processing devices is configured to change a format of the electronic request message received from the third data processing device prior to transmitting the electronic request message to each of the other first data processing devices.

Clause 20. A data processing system according to clause 19, wherein the circuitry of the first one of the plurality of first data processing devices is configured to receive the electronic request message from the third data processing device as a Hypertext Transfer Protocol (HTTP) request and to change the format of the electronic request message to a non-HTTP format.

Clause 21. A data processing system according to any one of clauses 17 to 20, comprising a hub device via which the plurality of first data processing device are connected to each other, wherein, when data is transmitted from a first one of the first data processing devices to a second one of the first data processing devices, the data is transmitted via the hub device.

Clause 22. A data processing system according to clause 21, wherein the electronic request message is one of a plurality of electronic request messages and the hub is configured to transmit the plurality of electronic request messages to each of the plurality of first data processing devices in the same order.

Clause 23. A system comprising a plurality of data processing devices, wherein each data processing device comprises circuitry configured to: receive an electronic request message;

perform a first predetermined process using the electronic request message to generate first electronic information;

receive, from each of the other data processing devices, respective first characteristic data of respective second electronic information generated by that other data processing device performing a respective second predetermined process using the electronic request message;

generate, for each of the other data processing devices, respective second characteristic data of the first electronic information;

compare, for each of the other data processing devices, the first characteristic data with the second characteristic data, wherein the first characteristic data of that other data processing device is known to match the second characteristic data of that other data processing device when the first electronic information matches the second electronic information generated by that other data processing device; and when one or more matches between the first characteristic data and second characteristic data for the other data processing devices meet a predetermined condition, perform a third predetermined process using the first electronic information.

Clause 24. A method of operating a first data processing device, the method comprising controlling circuitry of the first data processing device to carry out the steps of receiving an electronic request message;

performing a first predetermined process using the electronic request message to generate first electronic information;

receiving, from each of one or more second data processing devices, respective first characteristic data of respective second electronic information generated by that second data processing device performing a respective second predetermined process using the electronic request message;

generating, for each of the one or more second data processing devices, respective second characteristic data of the first electronic information;

comparing, for each of the one or more second data processing devices, the first characteristic data with the second characteristic data, wherein the first characteristic data of each second data processing device is known to match the second characteristic data of that second data processing device when the first electronic information matches the second electronic information generated by that second data processing device; and when one or more matches between the first characteristic data and second characteristic data for the one or more second data processing devices meet a predetermined condition, performing a third predetermined process using the first electronic information.

Clause 25. A program for controlling a computer to perform a method according to clause 24.

Clause 26. A storage medium storing a program according to clause 25.

Although, in some of the above-mentioned embodiments, the present technique is applied as part of an electronic payments scheme, it will be appreciated that this is only an example and that the present technique may be applied to any other scheme involving the transfer of electronic messages from one party to another (e.g. over a computer network). Such electronic messages may be, for example, electronic communication messages (e.g. sent via an instant messaging platform), electronic messages comprising computer code (e.g. software updates or the like) or automatically generated transaction confirmation messages (e.g. electronic invoices, receipts, booking confirmations or the like). Other types of electronic message are also envisaged.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. A first data processing device comprising circuitry configured to:
   receive an electronic request message;
   perform a first predetermined process using the electronic request message to generate first electronic information;
   receive, from one or more second data processing devices, first characteristic data of respective second electronic information generated by the one or more second data processing devices performing a second predetermined process using the electronic request message;
   generate, for the one or more second data processing devices, second characteristic data of the first electronic information;
   compare, for the one or more second data processing devices, the first characteristic data with the second characteristic data, wherein the first characteristic data of the one or more second data processing devices is known to match the second characteristic data of the one or more second data processing devices when the first electronic information matches the second electronic information generated by the one or more second data processing devices; and
   when one or more matches between the first characteristic data and the second characteristic data for the one or more second data processing devices meet a predetermined condition, perform, at the first data processing device, a third predetermined process using the first electronic information.

2. The first data processing device according to claim 1, wherein:
   the first characteristic data received from the one or more second data processing devices is a first cryptographic hash generated by cryptographically hashing data generated using a combination of the second electronic information generated by the one or more second data processing devices and an identifier of the one or more second data processing devices; and
   the second characteristic data generated for the one or more second data processing devices is a second cryptographic hash generated by cryptographically hashing data generated using a combination of the first electronic information and an identifier of the one or more second data processing devices.

3. The first data processing device according to claim 1, wherein:
   the first predetermined process comprises execution of a service using information contained within the electronic request message and the first electronic information is a first object comprising a first outcome of the execution of the service;
   the second predetermined process comprises execution of the service using information contained within the electronic request message and the second electronic information is a second object comprising a second outcome of the execution of the service; and
   the third predetermined process comprises implementing a third outcome of the execution of the service comprised within the first object.

4. The first data processing device according to claim 3, wherein implementing the outcome of the execution of the service comprises generating a response to the electronic request message to be transmitted to a predetermined third data processing device.

5. The first data processing device according to claim 3, wherein implementing the outcome of the execution of the service comprises generating a further electronic request message to be transmitted to a predetermined fourth data processing device.

6. The first data processing device according to claim 3, wherein implementing the outcome of the execution of the service comprises changing electronic data in an electronic data repository.

7. The first data processing device according to claim 6, further comprising a storage medium, wherein:
   the storage medium stores a first copy of the electronic data repository, the first copy of the electronic data repository being inaccessible to each of the one or more second data processing devices, and a second copy of an electronic data repository, the second copy of the electronic data repository being replicated across each of the one or more second data processing devices;
   the first predetermined process comprises changing electronic data in the first copy of the electronic data repository; and
   the third predetermined process comprises changing electronic data in the second copy of the electronic data repository.

8. The first data processing device according to claim 6, wherein the electronic data repository comprises a shared ledger and the electronic request message comprises a request to add a transaction to the shared ledger.

9. The first data processing device according to claim 6, wherein the electronic data repository is a database and the electronic request message is received from a third data processing device via database driver implemented at the third data processing device.

10. The first data processing device according to claim 1, wherein the predetermined condition of the one or more matches between the first characteristic data and the second characteristic data for the one or more second data processing devices is that there is a match between the first characteristic data and the second characteristic data for at least a predetermined number or proportion of the one or more second data processing devices.

11. A system comprising a plurality of data processing devices, wherein each data processing device comprises circuitry configured to:
   receive an electronic request message;
   perform a first predetermined process using the electronic request message to generate first electronic information;
   receive, from the plurality of data processing devices, first characteristic data of respective second electronic information generated by the plurality of data processing devices performing a second predetermined process using the electronic request message;
   generate, for the plurality of data processing devices, second characteristic data of the first electronic information;
   compare, for the plurality of data processing devices, the first characteristic data with the second characteristic data, wherein the first characteristic data of the plurality of data processing devices is known to match the second characteristic data of the plurality of data processing devices when the first electronic information matches the second electronic information generated by the plurality of data processing devices; and
   when one or more matches between the first characteristic data and the second characteristic data for the plurality of data processing devices meet a predetermined condition, perform a third predetermined process using the first electronic information.

12. A method of operating a first data processing device, the method comprising controlling circuitry of the first data processing device to carry out the steps of:
- receiving an electronic request message;
- performing a first predetermined process using the electronic request message to generate first electronic information;
- receiving, from one or more second data processing devices, first characteristic data of respective second electronic information generated by the one or more second data processing device performing a second predetermined process using the electronic request message;
- generating, for the one or more second data processing devices, second characteristic data of the first electronic information;
- comparing, for the one or more second data processing devices, the first characteristic data with the second characteristic data, wherein the first characteristic data of the one or more second data processing device is known to match the second characteristic data of that second data processing device when the first electronic information matches the second electronic information generated by the second data processing devices; and
- when one or more matches between the first characteristic data and the second characteristic data for the one or more second data processing devices meet a predetermined condition, performing a third predetermined process using the first electronic information.

* * * * *